(12) United States Patent
Teraoka et al.

(10) Patent No.: US 11,231,359 B2
(45) Date of Patent: Jan. 25, 2022

(54) MULTI-ANGLE COLORIMETER

(71) Applicant: KONICA MINOLTA, INC., Chiyoda-ku (JP)

(72) Inventors: Yoshitaka Teraoka, Suita (JP); Tomomi Setoguchi, Chigasaki (JP)

(73) Assignee: Konica Minolta, Inc., Tokyo (JP)

(*) Notice: Subject to any disclaimer, the term of this patent is extended or adjusted under 35 U.S.C. 154(b) by 53 days.

(21) Appl. No.: 16/764,188

(22) PCT Filed: Sep. 11, 2018

(86) PCT No.: PCT/JP2018/033654
§ 371 (c)(1),
(2) Date: May 14, 2020

(87) PCT Pub. No.: WO2019/097825
PCT Pub. Date: May 23, 2019

(65) Prior Publication Data
US 2020/0378887 A1    Dec. 3, 2020

(30) Foreign Application Priority Data
Nov. 16, 2017    (JP) .............................. JP2017-221013

(51) Int. Cl.
*G01N 21/25*    (2006.01)
*G01N 21/55*    (2014.01)

(52) U.S. Cl.
CPC ........... *G01N 21/251* (2013.01); *G01N 21/55* (2013.01); *G01N 2201/061* (2013.01)

(58) Field of Classification Search
CPC ...... G01N 21/25; G01N 21/251; G01N 21/55; G01N 2201/061; G01N 2021/4711; G01N 2021/556; G01N 21/255; G01J 3/50
See application file for complete search history.

(56) References Cited

U.S. PATENT DOCUMENTS

| 8,033,706 B1 * | 10/2011 | Kelly ................ G02F 1/133606 |
| | | 362/607 |
| 2008/0019114 A1 * | 1/2008 | Stuyven ............ G02F 1/133603 |
| | | 362/23.18 |

(Continued)

FOREIGN PATENT DOCUMENTS

| CN | 103797597 A * | 5/2014 | ........... H01L 33/507 |
| CN | 109643745 A * | 4/2019 | ............. H01L 33/46 |

(Continued)

OTHER PUBLICATIONS

Search Report and Written Opinion dated Dec. 11, 2018 dated Dec. 11, 2018 issued in International Patent Application No. PCT/JP2018/033654.

(Continued)

*Primary Examiner* — Tung S Lau
(74) *Attorney, Agent, or Firm* — Cozen O'Connor

(57) ABSTRACT

A multi-angle colorimeter includes an index calculation unit that calculates, based on a predetermined calculation formula, an index corresponding to luminance of a glittering material used in metallic coating or pearl coating by using optical parameters for color evaluation of the metallic coating or pearl coating on a surface of an object.

20 Claims, 10 Drawing Sheets

(56) References Cited

U.S. PATENT DOCUMENTS

| | | | |
|---|---|---|---|
| 2008/0113183 A1* | 5/2008 | Kitai | H05B 33/24 |
| | | | 428/332 |
| 2009/0284772 A1 | 11/2009 | Sai et al. | |
| 2013/0041858 A1 | 2/2013 | Fujieda et al. | |
| 2014/0152990 A1 | 6/2014 | Ehbets et al. | |
| 2018/0226543 A1* | 8/2018 | Masui | H01L 33/486 |
| 2019/0293560 A1 | 9/2019 | Yamanoi et al. | |
| 2020/0363319 A1* | 11/2020 | Teraoka | G01N 21/251 |

FOREIGN PATENT DOCUMENTS

| | | | | |
|---|---|---|---|---|
| JP | 2003-279413 | | 10/2003 | |
| JP | 2003-294530 | | 10/2003 | |
| JP | 2004-286672 | | 10/2004 | |
| JP | 2008-122335 | | 5/2008 | |
| JP | 41-52786 B2 | | 9/2008 | |
| JP | 415278 | * | 9/2008 | G01J 3/46 |
| JP | 2012-79474 A | * | 2/2012 | F21S 2/00 |
| JP | 2017-041796 | | 2/2017 | |
| KR | 10-0779777 B1 | * | 11/2007 | H05B 33/22 |
| SU | 1642333 A1 | * | 4/1991 | G01N 21/43 |
| SU | 1642334 A1 | * | 4/1991 | G01N 21/43 |
| WO | WO 2008/156147 | | 12/2008 | |
| WO | WO 2017/023502 A1 | * | 2/2017 | H01L 33/46 |
| WO | WO 2017/188085 | | 11/2017 | |

OTHER PUBLICATIONS

Office Action dated Nov. 17, 2021 issued in Japanese Patent Application No. 2019-553709.

* cited by examiner

MULTI-ANGLE COLORIMETER

RELATED APPLICATIONS

This is a U.S. National Phase Application under 35 USC 371 of International Application PCT/JP2018/033654 filed on Sep. 11, 2018.

This application claims the priority of Japanese application no. 2017-221013 filed Nov. 16, 2017, the entire content of which is hereby incorporated by reference.

TECHNICAL FIELD

The present invention relates to a multi-angle colorimeter.

BACKGROUND ART

In recent years, in the field of industrial products such as vehicles, metallic coating or pearl coating (hereinafter, collectively referred to as "metallic/pearl coating" or "metallic/pearl color coating") is known as a method of realizing higher designability. In metallic/pearl color coating, the appearance of colors can be made different depending on the angle at which the coated surface is observed, due to the effect of the glittering material (flake-like aluminum pieces or mica pieces) contained in the coating.

As described above, in the metallic/pearl color coating, since the appearance of the color differs depending on the observation angle with respect to the coated surface, it is necessary to perform color evaluation for each of a plurality of observation angles. Therefore, a multi-angle colorimeter is generally used for color evaluation of metallic/pearl color coating. The multi-angle colorimeter illuminates the coated surface and receives reflected light (visible light) from the coated surface at a plurality of angles, so that the spectral reflectance of the reflected light can be measured at each angle. Further, based on the measured spectral reflectance, for example, tristimulus values XYZ in an XYZ color system, and brightness (L*) and a* and b* values in an L*a*b* color system are obtained. Therefore, it is possible to evaluate the color for each of a plurality of observation angles based on these optical parameters.

Here, to evaluate the metallic/pearl color coating, characteristics other than the color such as a glittering effect of the glittering material is needed to be evaluated as its texture, in addition to the above-described color evaluation. In this regard, for example, in Patent Literature 1, a digital camera measures a surface of an object to which metallic coating has been applied from a direction of a shade of 75° (a direction in which a deflection angle with respect to a specular reflection direction of illumination light is 75°), and evaluates its texture by obtaining a value (HB value) representing a luminance effect of the shade using an image analysis.

CITATION LIST

Patent Literature

Patent Literature 1: JP 2003-279413 A (see paragraphs [0008], [0045] to [0061], FIG. 1, FIG. 9, etc.)

SUMMARY OF INVENTION

Technical Problem

However, in a case where the texture evaluation of metallic/pearl color coating (especially the evaluation of glittering effect) is performed using a digital camera as described in Patent Literature 1, and the color evaluation is performed using a multi-angle colorimeter as described above and the texture evaluation is performed using a device (digital camera) different from the multi-angle colorimeter. In this manner, performing the color evaluation and the texture evaluation using different apparatuses causes an increase in the size and cost of the entire apparatus used for evaluating the metallic/pearl color coating.

The present invention has been made in order to solve the above-described problems, and has an object to provide a multi-angle colorimeter capable of avoiding an increase in size and cost of an entire device that evaluates metallic coating or pearl coating, including color evaluation and texture evaluation (especially, evaluation of glittering effect).

Solution to Problem

A multi-angle colorimeter according to one aspect of the present invention includes a light emitting unit that emits light onto an object, a light amount detection unit that receives the light emitted from the light emitting unit and reflected by the object in a plurality of directions of angles, and detects a reflected light amount in each of the angles, and an index calculation unit that obtains optical parameters, which are used in color evaluation of metallic coating or pearl coating on a surface of the object, based on the reflected light amount, and calculates, using the optical parameters, an index corresponding to luminance of a glittering material used in the metallic coating or the pearl coating, in which the index calculation unit calculates an index I expressed by a following equation, as the index corresponding to the luminance of the glittering material, when the specular reflection direction is 0° on a plane including an incident direction and a specular reflection direction of a principal light beam of the light emitted from the light emitting unit with respect to the object, and an angle direction inclined from the specular reflection direction toward the incident direction is defined as a positive direction, n is an integer equal to or greater than 2, the plurality of angles are respectively set to $\theta_1$ to $\theta_n$, in which the angles $\theta_1$ to $\theta_n$ are angles within a range of −15° to 45° respectively, the optical parameters obtained for direction of respective angles $\theta_1$ to $\theta_n$ based on the reflected light amount are $I(\theta_1)$ to $I(\theta_n)$ respectively, and weighting coefficients of the respective optical parameters $I(\theta_1)$ to $I(\theta_n)$ are $a_1$ to $a_n$ respectively, $$I = a_1 \cdot I(\theta_1) + a_2 \cdot I(\theta_2) + \ldots + a_n \cdot I(\theta_n)$$

where regarding the weighting coefficients $a_1$ to $a_n$, one is positive, another is negative, and rest is positive, negative, or zero.

A multi-angle colorimeter according to another aspect of the present invention includes a light emitting unit that emits light onto an object, a light amount detection unit that receives light emitted from the light emitting unit and reflected by the object in a plurality of directions of angles, and detects a reflected light amount in each of the angles, and an index calculation unit that obtains optical parameters, which is used in color evaluation of metallic coating or pearl coating on a surface of the object, based on the reflected light amount, and calculates, using the optical parameters, an index corresponding to luminance of a glittering material used in the metallic coating or the pearl coating, in which the index calculation unit calculates an index I expressed by a following equation, as the index corresponding to the luminance of the glittering material, when the specular reflection direction is 0° in a plane including an incident direction and a specular reflection direction of a principal light beam of the light emitted from the light emitting unit with respect to the object, and an angle direction inclined from the specular reflection direction toward the incident direction is defined as a positive direction, n and m are respectively an integer equal to or greater than 2, the plurality of angles are respectively set to $\theta_1$ to $\theta_n$, in which the angles $\theta_1$ to $\theta_n$ are angles within a range of −15° to 45° respectively, the optical parameters obtained for direction of respective angles $\theta_1$ to $\theta_n$ based on the reflected light amount are $I'_1(\theta_1)$ to $I'_1(\theta_n)$, $I'_2(\theta_1)$ to $I'_2(\theta_n)$, ..., $I'_m(\theta_1)$ to $I'_m(\theta_n)$ for each different wavelength band or each different wavelength, respectively, and weighting coefficients of the respective optical parameters $I'_1(\theta_1)$ to $I'_1(\theta_n)$, $I'_2(\theta_1)$ to $I'_2(\theta_n)$, ..., $I'_m(\theta_1)$ to $I'_m(\theta_n)$ are $a_1$ to $a_n$ respectively, $$I_1 = a_1 \cdot I'_1(\theta_1) + a_2 \cdot I'_1(\theta_2) + \ldots + a_n \cdot I'_1(\theta_n)$$
$$I_2 = a_1 \cdot I'_2(\theta_1) + a_2 \cdot I'_2(\theta_2) + \ldots + a_n \cdot I'_2(\theta_n)$$
$$\ldots$$
$$I_m = a_1 \cdot I'_m(\theta_1) + a_2 \cdot I'_m(\theta_2) + \ldots + a_n \cdot I'_m(\theta_n)$$
$$I = I_1 + I_2 + \ldots + I_m$$

where regarding the weighting coefficients $a_1$ to $a_n$, one is positive, another is negative, and rest is positive, negative, or zero.

A multi-angle colorimeter according to still another aspect of the present invention includes a light emitting unit that emits light onto an object, a light amount detection unit that receives light emitted from the light emitting unit and reflected by the object in a plurality of directions of angles, and detects a reflected light amount in each of the angles, and an index calculation unit that obtains optical parameters, which is used in color evaluation of metallic coating or pearl coating on a surface of the object, based on the reflected light amount, and calculates, using the optical parameters, an index corresponding to luminance of a glittering material used in the metallic coating or the pearl coating, in which the index calculation unit calculates an index I expressed by a following equation, as the index corresponding to the luminance of the glittering material, when the specular reflection direction is 0° in a plane including an incident direction and a specular reflection direction of a principal light beam of the light emitted from the light emitting unit with respect to the object, and an angle direction inclined from the specular reflection direction toward the incident direction is defined as a positive direction, n and m are respectively an integer equal to or greater than 2, the plurality of angles are respectively set to $\theta_1$ to $\theta_n$, in which the angles $\theta_1$ to $\theta_n$ are angles within a range of −15° to 45° respectively, the optical parameters obtained for direction of respective angles $\theta_1$ to $\theta_n$ based on the reflected light amount are two types of $J(\theta)$ and $K(\theta)$ where at least one of $J(\theta)$ and $K(\theta)$ has wavelength dependency, $J(\theta)=J_1(\theta_1)$ to $J_1(\theta_n)$, $J_2(\theta_1)$ to $J_2(\theta_n)$, ..., $J_m(\theta_1)$ to $\theta_m(\theta_n)$, $K(\theta)=K_1(\theta_P)$, $K_2(\theta_P)$, ..., $K_3(\theta_P)$, ..., $K_m(\theta_P)$, where P is an integer of any one of 1 to n, and the weighting coefficients of the respective optical parameter $J(\theta)$ are respectively two type of $a_1$ to $a_n$ and $b_1$ to $b_n$, $$I_1 = [\{a_1 \cdot J_1(\theta_1) + a_2 \cdot J_1(\theta_2) + \ldots + a_n \cdot J_1(\theta_n)\}/$$
$$\{b_1 \cdot J_1(\theta_1) + b_2 \cdot J_1(\theta_2) + \ldots + b_n \cdot J_1(\theta_n)\}] \cdot K_1(\theta_P)$$
$$I_2 = [\{a_1 \cdot J_2(\theta_1) + a_2 \cdot J_2(\theta_2) + \ldots + a_n \cdot J_2(\theta_n)\}/$$
$$\{b_1 \cdot J_2(\theta_1) + b_2 \cdot J_2(\theta_2) + \ldots + b_n \cdot J_2(\theta_n)\}] \cdot K_2(\theta_P)$$
$$\ldots$$
$$I_m = [\{a_1 \cdot J_m(\theta_1) + a_2 \cdot J_m(\theta_2) + \ldots + a_n \cdot J_m(\theta_n)\}/$$
$$\{b_1 \cdot J_m(\theta_1) + b_2 \cdot J_m(\theta_2) + \ldots + b_n \cdot J_m(\theta_n)\}] \cdot K_m(\theta_P)$$
$$I = I_1 + I_2 + \ldots + I_m$$

where regarding the weighting coefficients $a_1$ to $a_n$, one is positive, another is negative, and rest is positive, negative, or zero, and the respective weighting coefficients $b_1$ to $b_n$ are any of positive, negative, and zero, except a case where all are zero.

Advantageous Effects of Invention

According to the above configurations, using a multi-angle colorimeter used for color evaluation, texture evaluation (especially evaluation of glittering effect) can be performed based on the index I calculated by an index calculation unit of the colorimeter. Accordingly, it is possible to avoid an increase in the size and cost of the entire device for evaluating the metallic coating or the pearl coating, including the color evaluation and the texture evaluation.

DESCRIPTION OF EMBODIMENTS

First Embodiment

One embodiment of the present invention will be described below with reference to the drawings. Note that, in this specification, when a numerical range is expressed as "a to b," the numerical range includes a lower limit a and an upper limit b. Further, the present invention is not limited to the following contents.

(1. Multi-Angle Colorimeter)

Figure 1:
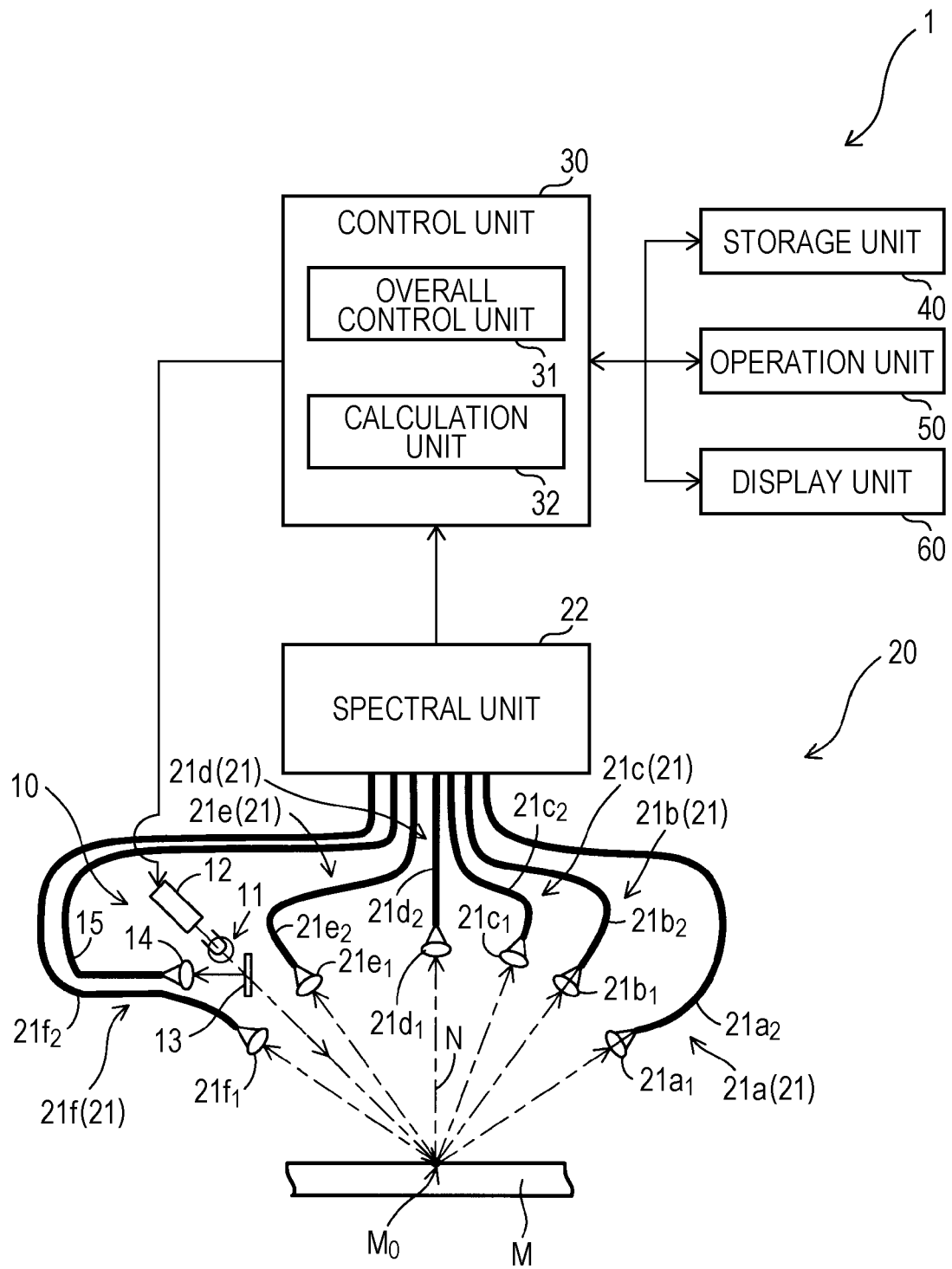
FIG. 1 is an explanatory diagram schematically illustrating an entire configuration of a multi-angle colorimeter according to a first embodiment of the present invention.

FIG. 1 is an explanatory diagram schematically illustrating the overall configuration of a multi-angle colorimeter 1 according to the present embodiment. The multi-angle colorimeter 1 is a device for performing color evaluation and texture evaluation of metallic coating or pearl coating applied to an object M, and includes a light emitting unit 10, a light amount detection unit 20, a control unit 30, a storage unit 40, an operation unit 50, and a display unit 60. Here, the object M refers to a vehicle body that has been subjected to metallic coating or pearl coating, or a coating sample (sample) of the vehicle body. The vehicle body includes a part of the vehicle body such as an exterior part (a fender, a door, and the like) in addition to a vehicle as a finished product.

(1-1. Light Emitting Unit)

The light emitting unit 10 is an illuminating unit that emits light to the object M and illuminates the object M and, according to the present embodiment, the light emitting unit 10 illuminates the object M from a direction of 45° with respect to a normal line N at a measurement point $M_0$ on the coated surface of the object M. Such a light emitting unit 10 includes a light source device 11, a light emitting circuit 12, a half mirror 13, a lens 14, and a light guide unit 15.

The light source device 11 includes a light source made of a xenon flash lamp for example, a regulating plate that regulates a light beam emitted from the light source, and a collimating lens that converts the light beam emitted from the light source and regulated by the regulating plate into parallel light. The light emitting circuit 12 is a circuit that causes the light source of the light source device 11 to emit light under the control of the control unit 30, and is provided near the light source device 11. The half mirror 13 reflects a part of the light emitted from the light source device 11 toward the lens 14 and transmits the remaining light (illumination light) toward the object M. The lens 14 transmits the light reflected by the half mirror 13 among the light emitted from the light source device 11 and collects the light on one end face of the light guide unit 15. The light guide unit 15 is made of, for example, an optical fiber, and internally guides light incident on one end face via the lens 14 and guides the light to a later-described spectral unit 22 of the light amount detection unit 20.

(1-2. Light Amount Detection Unit)

The light amount detection unit 20 is a unit that receives light emitted from the light emitting unit 10 and reflected by the object M in a plurality of angular directions, respectively, and detects the reflected light amount at each of the plurality of angles. The light amount detection unit 20 has a plurality of light receiving units 21 and the spectral unit 22.

According to the present embodiment, the plurality of light receiving units 21 are composed of six light receiving units 21a to 21f. Note that the number of the light receiving units 21 may be any plural number, and is not limited to the above six. The light receiving units 21a to 21f includes lenses $21a_1$ to $21f_1$ and light guide units $21a_2$ to $21f_2$ respectively. The lenses $21a_1$ to $21f_1$ transmit the light emitted from the light emitting unit 10 (the light source device 11) and reflected on the surface of the object M in a plurality of angular directions, and collects the lights to one end faces of the light guide units $21a_2$ to $21f_2$. Each of the light guide units $21a_2$ to $21f_2$ is made of, for example, an optical fiber, and internally guides light incident on one end face through the lenses $21a_1$ to $21f_1$, and guides the light to the spectral unit 22. The other end surfaces of the light guide unit 15 and the light guide units $21a_2$ to $21f_2$ are supported by a housing 22a of the spectral unit 22 (see FIG. 2).

Here, the specular reflection direction is 0° in a plane including the incident direction and the specular reflection direction of the principal light beam of the light emitted from the light emitting unit 10 (center ray of the light flux) with respect to the object M (measurement point $M_0$) (parallel to the paper face of FIG. 1), and the measurement point $M_0$ is used as a reference (fulcrum), and the angle direction that tilts (rotates) from the specular reflection direction toward the incident direction is considered to be a positive direction. According to the present embodiment, as the plurality of angles (directions), for example, −15°, +15°, +25°, +45°, +75°, and +110° are considered. Note that, in the following, the angles of +15°, +25°, +45°, +75°, and +110° are also expressed as 15°, 25°, 45°, 75° and 110° simply by omitting the positive signs (+). Note that the plurality of angles are not limited to the above angles.

Note that the angle θ based on the specular reflection direction is also referred to as Asθ. As is an abbreviation of aspecular, and indicates a deviation from the direction of specular reflection. Therefore, the multiple angles described above can also be expressed as As(−15°), As(15°), As(25°), As(45°), As(75°), and As(110°).

Figure 2:
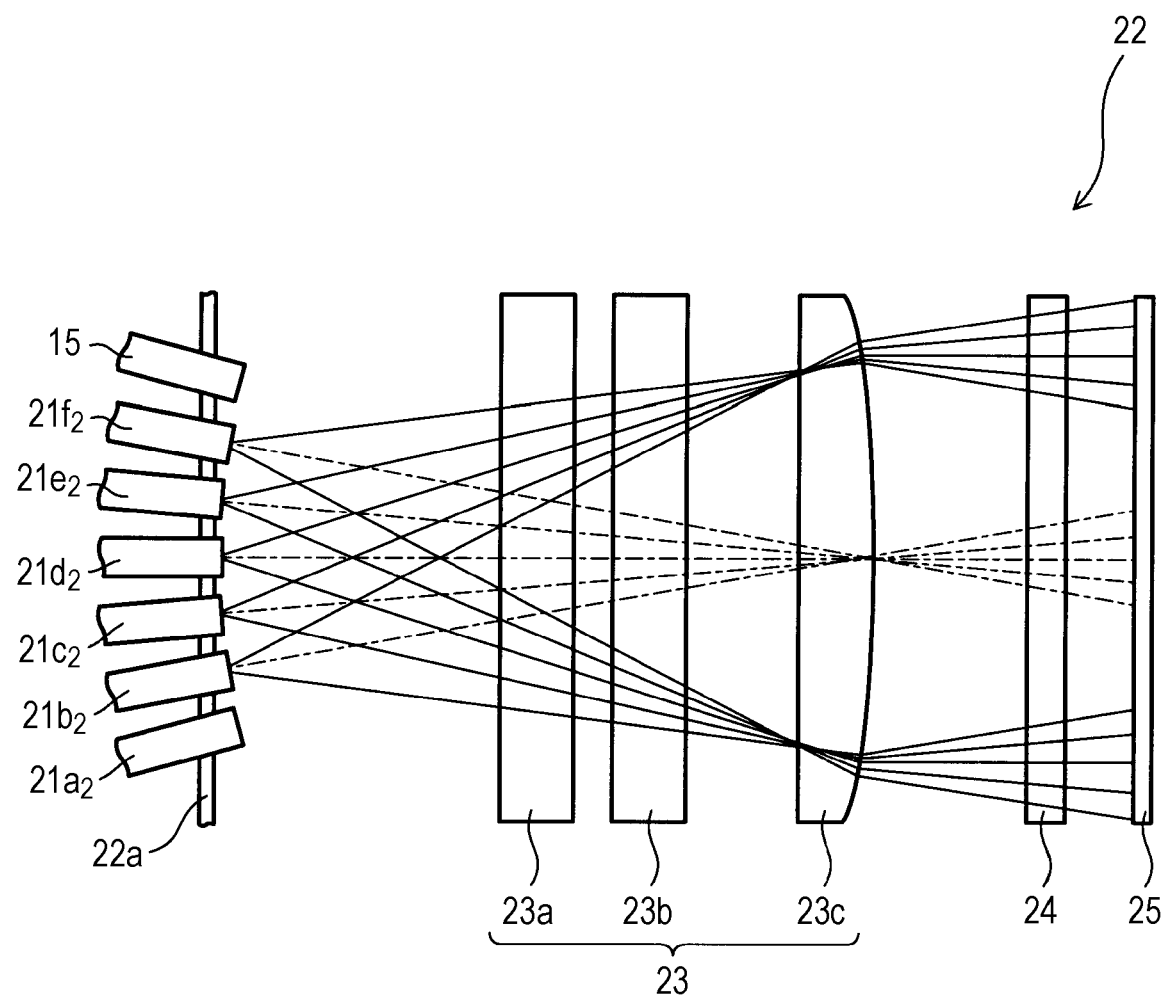
FIG. 2 is a cross-sectional view schematically illustrating an outline configuration of a spectral unit of the multi-angle colorimeter.

The spectral unit 22 splits the light incident through each of the light receiving units 21a to 21f (particularly, the light guide units $21a_2$ to $21f_2$), detects the reflected light amount (light reception amount) at each of the plurality of angles and detects the received amount of light entered through the light guide unit 15 of the light emitting unit 10. FIG. 2 is a cross-sectional diagram schematically illustrating a schematic configuration of the spectral unit 22. Note that, in FIG. 2, optical paths of light emitted from other end surfaces of the five light guide units $21b_2$ to $21f_2$ among the light guide unit 15 and the light guide units $21a_2$ to $21f_2$ are representatively illustrated. The spectral unit 22 includes a condensing optical system 23, a spectral section 24, and a light detection unit 25.

The condensing optical system 23 includes, for example, a plurality of cylindrical lenses 23a to 23c, and shapes the incident light into a linear light flux extending in one direction (the direction of arrangement of the light guide unit 15 and the light guides 21a$_2$ to 21f$_2$ in FIG. 2). The spectral section 24 includes, for example, a linear variable filter (LVF) or a split filter. The LVF is a filter that varies the wavelength of transmitted light according to the incident position of light in one direction (also referred to as a wavelength change direction). The split filter is a filter configured by arranging a large number of filters having mutually different wavelengths of transmitted light in the one direction.

The light detection unit 25 includes a plurality of photoelectric conversion elements that generate and output an electric signal corresponding to the wavelength of light transmitted through the spectral section 24 or the intensity of each wavelength range. As the photoelectric conversion element, for example, an optical sensor such as a charge coupled device (CCD) can be used. The plurality of photoelectric conversion elements are arranged at mutually different positions in the one direction in which the wavelength of the light transmitted through the spectral section 24 changes, thereby forming a line sensor.

In the spectral unit 22 having the above configuration, the light emitted from the other end surfaces of the light guide units 21a$_2$ to 21f$_2$ is shaped into a linear light flux in the one direction by the condensing optical system 23, then split in one direction by the spectral section 24, and is incident on the light detection unit 25. The light detection unit 25 detects the light reception amount according to the wavelength of the incident light for each of the light guide units 21a$_2$ to 21f$_2$, which is each of a plurality of angles that are reflection directions on the object M. The electric signal corresponding to the light reception amount is output to the control unit 30. Further, based on the similar principle, with respect to light incident through the light guide unit 15 of the light emitting unit 10, the light reception amount is detected by the light detection unit 25, and an electric signal corresponding to the received light amount is output to the control unit 30.

In the spectral unit 22, a shutter may be provided near the other end faces of the light guide unit 15 and the light guide units 21a$_2$ to 21f$_2$, and transmission/blocking of the light emitted from each light guide unit may be respectively controlled by turning each shutter ON/OFF.

(1-3. Control Unit)

Returning to FIG. 1, the description will be continued. The control unit 30 includes, for example, a central processing unit (CPU), and operates based on an operation program stored in the storage unit 40. Such a control unit 30 includes an overall control unit 31 and a calculation unit 32.

The overall control unit 31 controls the operation of each unit of the multi-angle colorimeter 1. Further, the overall control unit 31 controls the light emitting circuit 12 of the light source based on the amount of light received from the light guide unit 15 of the light amount detection unit 20 and detected by the light detection unit 25. This allows the light source to emit light with an appropriate amount of light for each of the objects M to be measured, thereby illuminating the object M.

The calculation unit 32 performs various calculations based on the electric signal output from the light amount detection unit 20. For example, the calculation unit 32 acquires the optical parameters used for the color evaluation of the metallic coating or the pearl coating on the surface of the object M, based on the reflected light amount detected by the light amount detection unit 20, which is expressed by the electric signal, and at the same time, acquires the optical parameters for each of a plurality of angles that are reflection directions on the object M. Therefore, when the optical parameters are displayed on the display unit 60 for each of the angles, the user viewing the display unit 60 looks at the displayed optical parameters and performs color evaluation of the surface of the object M at each of the angles.

Here, as the optical parameters, for example, there are a spectral reflectance, tristimulus values XYZ in an XYZ color system, brightness L* in an L*a*b* color system and a chromaticness index (a* value and b* value).

The spectral reflectance is expressed with a value (%) obtained by multiplying the ratio of the amount of light reflected by the object M to the amount of reflected light (which is assumed to be known) obtained by reflecting light on the perfect diffuse reflection surface by 100, regarding each wavelength. In a case where the optical parameter is the spectral reflectance, for example, the color or shading of the coating applied to the surface of the object M can be evaluated based on the spectral reflectance.

The tristimulus values XYZ in the XYZ color system is calculated by the following Equation 1 or Equation 2. Equation 1 shows a calculation formula of tristimulus values XYZ in a three-color color system (also referred to as a 2° visual field XYZ color system) based on a color matching function adopted in 1931 by the International Commission on Illumination (CIE). Equation 2 shows a calculation formula of tristimulus values $X_{10}Y_{10}Z_{10}$ in the three-color color system (also referred to as a 10° visual field XYZ color system) based on a color matching function adopted in 1964 by CIE. Note that, here, the tristimulus values XYZ of Equation 1 and the tristimulus value $X_{10}Y_{10}Z_{10}$ of Equation 2 are collectively referred to as tristimulus values XYZ. In a case where the optical parameters are tristimulus values XYZ, using those stimulus values, brightness (Y value, luminance value), chromaticity x $(=X/(X+Y+Z))$ and y $(=Y/(X+Y+Z))$ can be evaluated.

$$XYZ\,(CIE\,1931:\,2°\text{ visual field}) \quad [\text{Equation 1}]$$

$$X = K\sum S(\lambda)\bar{x}(\lambda)R(\lambda)$$

$$Y = K\sum S(\lambda)\bar{y}(\lambda)R(\lambda)$$

$$Z = K\sum S(\lambda)\bar{z}(\lambda)R(\lambda)$$

$$K = \frac{100}{\sum S(\lambda)\bar{y}(\lambda)}$$

where
λ: wavelength (nm)
S(k): value in wavelength k of relative spectral distribution of color-measuring standard light source
$\bar{x}(\lambda)$, $\bar{y}(\lambda)$, $\bar{z}(\lambda)$: color matching functions of XYZ color system (CIE 1931)
R(λ): spectral solid angle reflectance of sample $$X_{10}Y_{10}Z_{10}\,(CIE\,1964:\,10°\text{ visual field}) \quad [\text{Equation 2}]$$

$$X_{10} = K\sum S(\lambda)\bar{x}_{10}(\lambda)R(\lambda)$$

$$Y_{10} = K\sum S(\lambda)\bar{y}_{10}(\lambda)R(\lambda)$$

-continued $$Z_{10} = K \sum S(\lambda)\bar{z}_{10}(\lambda)R(\lambda)$$

$$K = \frac{100}{\sum S(\lambda)\bar{y}_{10}(\lambda)}$$

where
λ: wavelength (nm)
S(k): value in wavelength k of relative spectral distribution of color-measuring standard light source
$\bar{x}_{10}(\lambda)$, $\bar{y}_{10}(\lambda)$, $\bar{z}_{10}(\lambda)$: color matching functions of $X_{10}Y_{10}Z_{10}$ color system (CIE 1964)
R(λ): spectral solid angle reflectance of sample The brightness L* in the L*a*b* color system is calculated by following Equation 3. The chromaticness index (a* value and b* value) is calculated by following Equation 4. Since hue and saturation can be determined from the a* value and the b* value, the brightness, hue, and saturation can be evaluated in a case where the optical parameters are L*, a* value, and b* value. Note that, in a case where X/Xn, Y/Yn, and Z/Zn in Equation 4 include $(24/116)^3 = 0.008856$ or less, the corresponding cubic root terms are respectively replaced by Equation 5 and calculated.

$$L* = 116\left(\frac{Y}{Yn}\right)^{1/3} - 16 \quad \left(\text{when } \frac{Y}{Yn} > 0.008856\right) \quad \text{[Equation 3]}$$

$$L* = 903.29\left(\frac{Y}{Yn}\right) \quad \left(\text{when } \frac{Y}{Yn} \le 0.008856\right)$$

where
Y: Y (2° visual field) or $Y_{10}$ (10° visual field) of tristimulus value in XYZ color system or $X_{10}Y_{10}Z_{10}$ color system of sample
Yn: Y (2° visual field) or $Y_{10}$ (10° visual field) of tristimulus value in XYZ color system or $X_{10}Y_{10}Z_{10}$ color system of perfect diffuse reflection surface $$\text{when } \frac{X}{Xn} > 0.008856, \frac{Y}{Yn} > 0.008856, \quad \text{[Equation 4]}$$

$$\frac{Z}{Zn} > 0.008856:$$

$$a* = 500\left\{\left(\frac{X}{Xn}\right)^{1/3} - \left(\frac{Y}{Yn}\right)^{1/3}\right\}$$

$$b* = 200\left\{\left(\frac{Y}{Yn}\right)^{1/3} - \left(\frac{Z}{Zn}\right)^{1/3}\right\}$$

where
X, Y, Z: tristimulus values in XYZ color system or $X_{10}Y_{10}Z_{10}$ color system of sample
Xn, Yn, Zn: tristimulus values in XYZ color system or $X_{10}Y_{10}Z_{10}$ color system of perfect diffuse reflection surface $$7.787\left(\frac{X}{Xn}\right) + \frac{16}{116} \quad \text{[Equation 5]}$$

$$7.787\left(\frac{Y}{Yn}\right) + \frac{16}{116}$$

$$7.787\left(\frac{Z}{Zn}\right) + \frac{16}{116}$$

(1-4. Storage Unit, Operation Unit, and Display Unit)

The storage unit 40 is configured by, for example, a nonvolatile memory, and stores various data (detected values) output from the light amount detection unit 20 and the like in addition to the operation program of the control unit 30. The operation unit 50 is an input unit that receives various inputs by the user. When the operation unit 50 is operated by the user, a signal corresponding to the operation is sent to the control unit 30, and under the control of the control unit 30, various operations (for example, power ON/OFF, starting/stopping color measurement, and the like) are executed. The display unit 60 is a display for displaying various information. For example, the results calculated by the calculation unit 32, such as the optical parameters described above and the index I described later, are displayed on the display unit 60.

(2. Calculation of Index Corresponding to Luminance of Glittering Material)

According to the present embodiment, the calculation unit 32 of the control unit 30 calculates an index corresponding to luminance of a glittering material used in metallic coating or pearl coating, using the optical parameters used for color evaluation. In this case, the calculation unit 32 functions as an index calculation unit that calculates the index. Hereinafter, the details of the index will be described.

Figure 3:
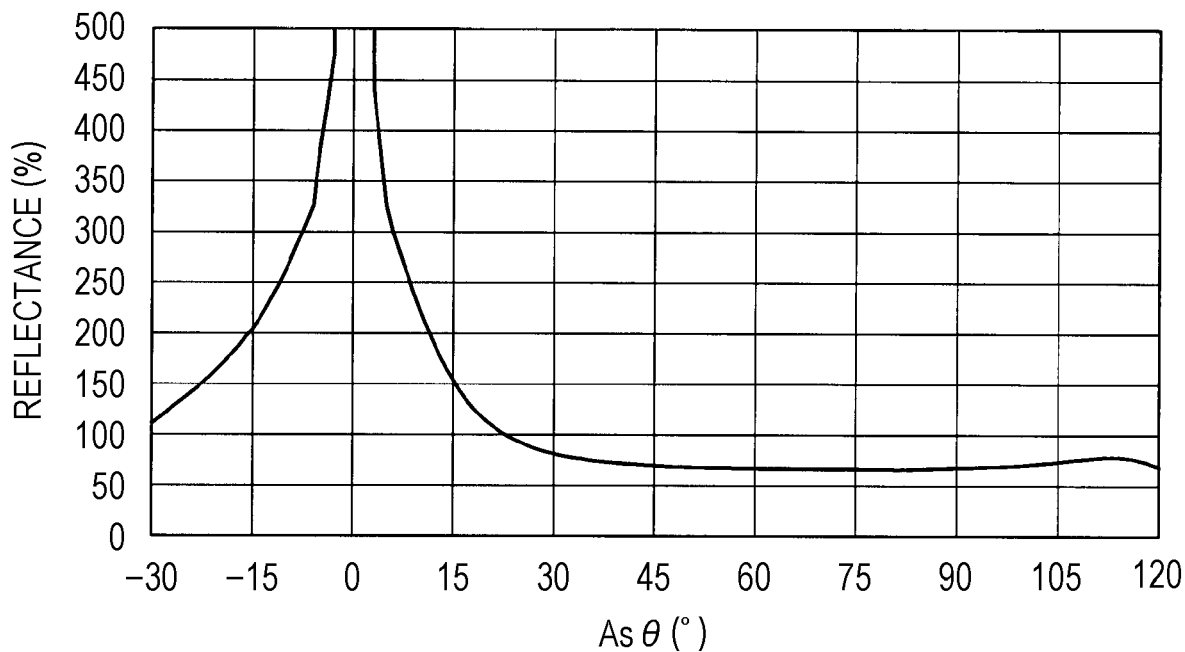
FIG. 3 is a graph illustrating gonio characteristics when a coating film formed by metallic coating or pearl coating is irradiated with light.

FIG. 3 illustrates gonio characteristics (reflection angle characteristics) in a case of irradiating light with a wavelength of 550 nm from an oblique 45° direction to a coating film formed by metallic coating or pearl coating (also referred to as metallic pearl coating). Such characteristics are obtained for the following reasons.

Figure 4:
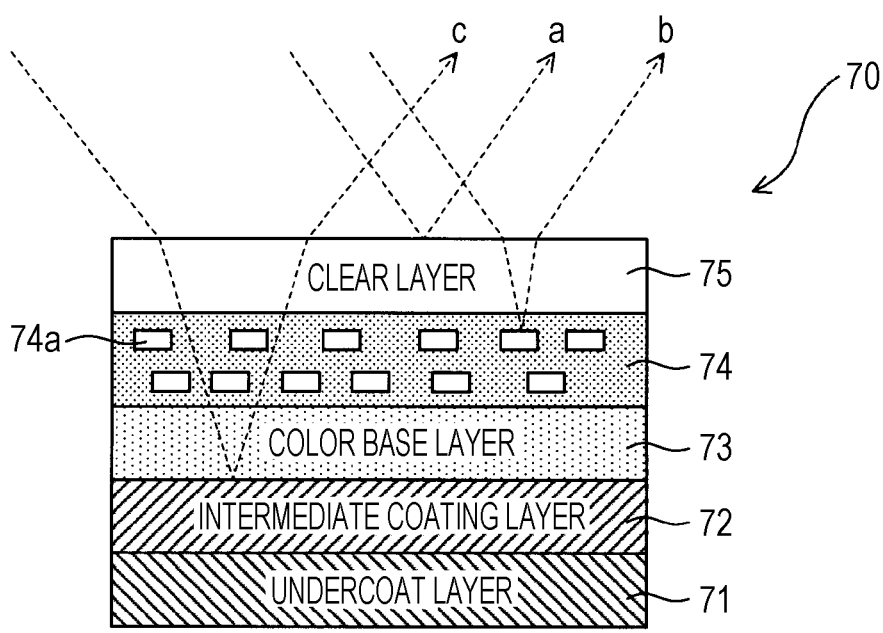
FIG. 4 is a cross-sectional view schematically illustrating a layer configuration of the coating film.

FIG. 4 schematically illustrates a layer configuration of a coating film 70 formed by metallic coating or pearl coating. The coating film 70 is formed by laminating an undercoat layer 71, an intermediate coating layer 72, a color base layer 73, a glittering material containing layer 74 including a glittering material 74a, and a clear layer 75 in this order from the object side. Note that the glittering material containing layer 74 may also serve as the color base layer 73. When light is applied to the coating film 70, the reflected light from the coating film 70 mainly includes the following three lights:

(1) Light spectrally reflected on a surface of the clear layer 75 of the coating film 70 (specular reflection light a)

(2) Light spectrally reflected by the glittering material 74a of the coating film 70 (specular reflection light b)

(3) Light diffusion and emitted inside the coating film 70 (diffuse reflection light c)

Figure 5:
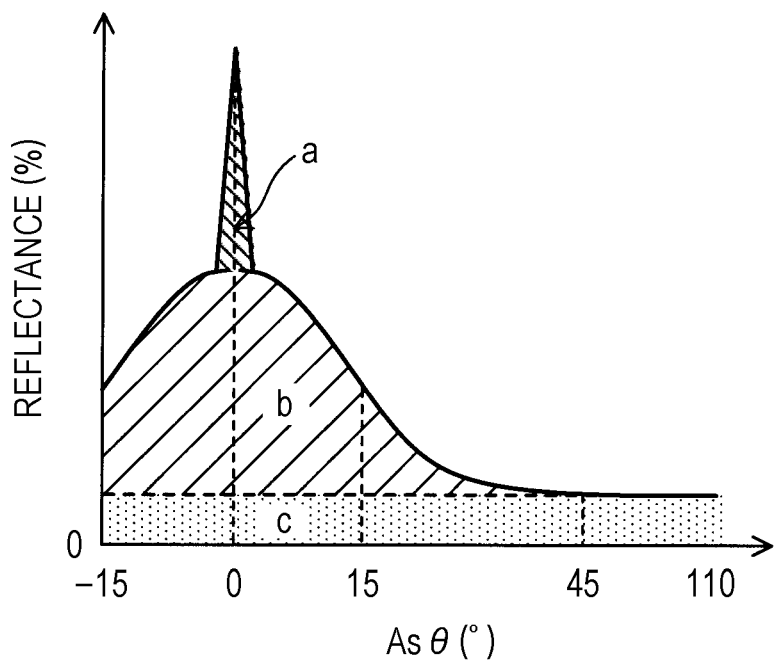
FIG. 5 is a graph further schematically illustrating the gonio characteristics of FIG. 3.

FIG. 5 is a graph further schematically illustrating the gonio characteristics of FIG. 3. The reflected light from the coating film 70 in a case where the coating film 70 is irradiated with light from an oblique 45° direction includes the specular reflection light a, the specular reflected light b, and the diffuse reflection light c illustrated in FIG. 4 so that the gonio characteristics have a distribution reflecting these lights. In other words, at an angle close to specular reflection (for example, As(−15°) to As(45°), due to influence of specular reflection light b by the glittering material 74a, reflectance is high compared to another angle direction (for example, As(45°) to As(110°)), and the reflectance is higher especially near As(0°), which is the specular reflection direction, since the proportion of specular reflection light a increases. Further, since the diffuse reflection light c is emitted substantially uniformly over the entire angular direction of As(−15°) to As(110°), it works to increase the reflectance over the entire angular range.

Here, the effect of the metallic material being observed when the metallic pearl coating is observed from the specular reflection direction, in which the glittering material appears as glittering, is referred to as "glittering effect". The glittering effect physically corresponds to magnitude of the amount of light (reflectance) of the reflected light from the glittering material, and also corresponds to the luminance Generally, in a case where a glittering material having a smoother surface and a higher reflectance is used, or in a case where the same glittering material is included at a higher density, the glittering effect becomes greater.

However, for example, even in a case where the reflectance is acquired by receiving light reflected by the object at 45° illumination from the specular reflection direction, since both components of the specular reflection light a and b are included, it cannot be said that only the reflected light (specular reflection light b) from the glittering material is strictly captured (see FIG. 5). Therefore, it is not appropriate to evaluate the glittering effect of the glittering material based only on the reflectance in the specular reflection direction.

Further, in a multi-angle colorimeters that are generally distributed use the geometry specified in ASTM E2194, which is a standard developed and issued by the American Society for Testing and Materials. For example, there is a design for irradiating an object with light at an incident angle of 45°, and receives the light reflected in each direction of As(−15°), As(15°), As(25°), As(45°), As(75°), and As(110°) (This design is also adopted in the present embodiment). In a multi-angle colorimeter with such a design, even when the reflected light is received at) As(15°) closest to the specular reflection direction and the reflectance is acquired, the magnitude of the reflectance may not much the magnitude of the glittering effect of the glittering material. This is because some glittering materials have high reflectance only in a limited angle range near specular reflection.

Figure 6:
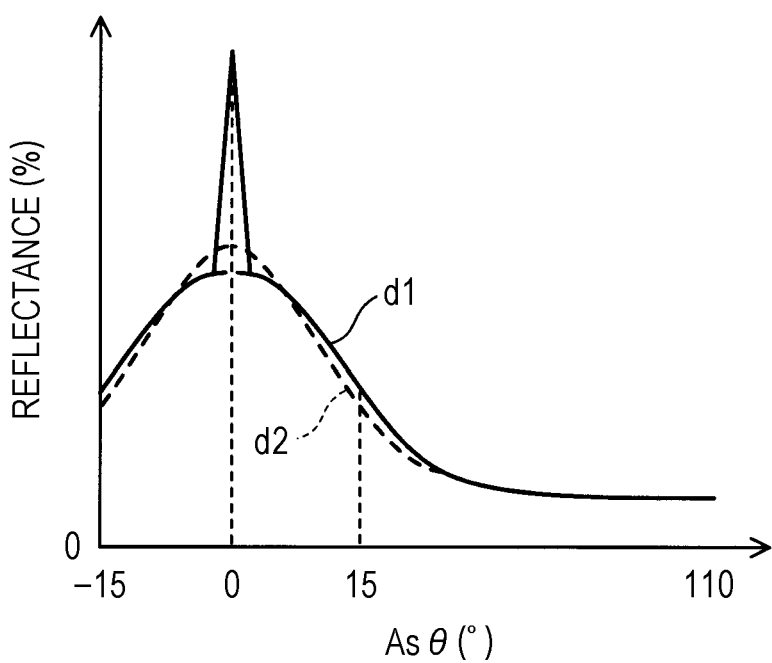
FIG. 6 is a graph schematically illustrating gonio characteristics of two types of glittering materials.

FIG. 6 schematically illustrates gonio characteristics of two types of glittering materials d1 and d2. As illustrated in the figure, the glittering material d2 has a lower reflectance at As(−) 15° and As(15°) but a higher reflectance near As(0°) than the glittering material d1, and thus only a limited angle range near specular reflection has a high reflectance. For this reason, it is not appropriate to evaluate the glittering effect of the glittering material based only on the reflectance at an angle close to specular reflection (for example, at As(−15°) or As(15°).

In other words, in a general multi-angle colorimeter, there may be some cases where the magnitude relationship between the reflectance at As(−15°) and As(15°) closest to specular reflection and the reflectance at As(0°), which is the specular reflection direction is reversed. For this reason, an index having a high correlation with the glittering effect may not be obtained only with the reflectance at a specific angle.

Therefore, the inventors of the present application focused on brightness L*, which is one of the optical parameters used for color evaluation, and examined the correlation between brightness L* and glittering effect. Then, based on the correlation between the brightness L* and the glittering effect, a calculation formula for calculating an index corresponding to the glittering effect was found, and this calculation formula was set as a calculation formula in the calculation unit 32. Hereinafter, the study of the correlation will be specifically described.

Figure 7:
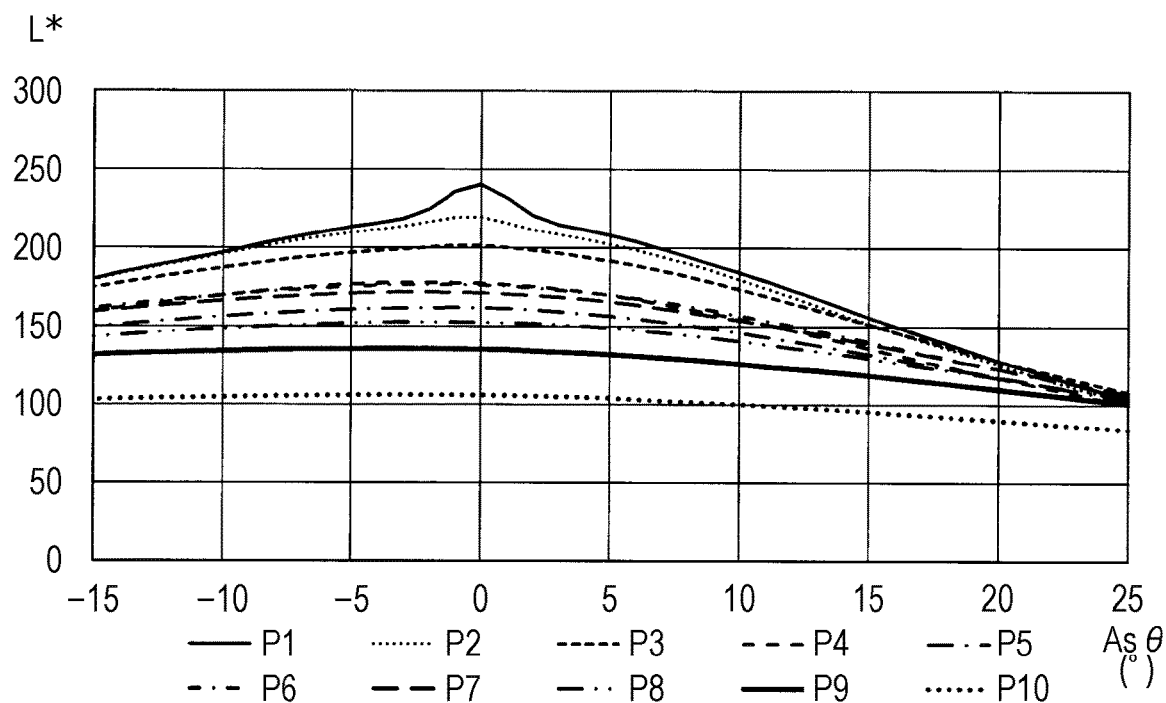
FIG. 7 is a graph illustrating an angular distribution of brightness for a plurality of samples having different glittering effect.
Figure 8:
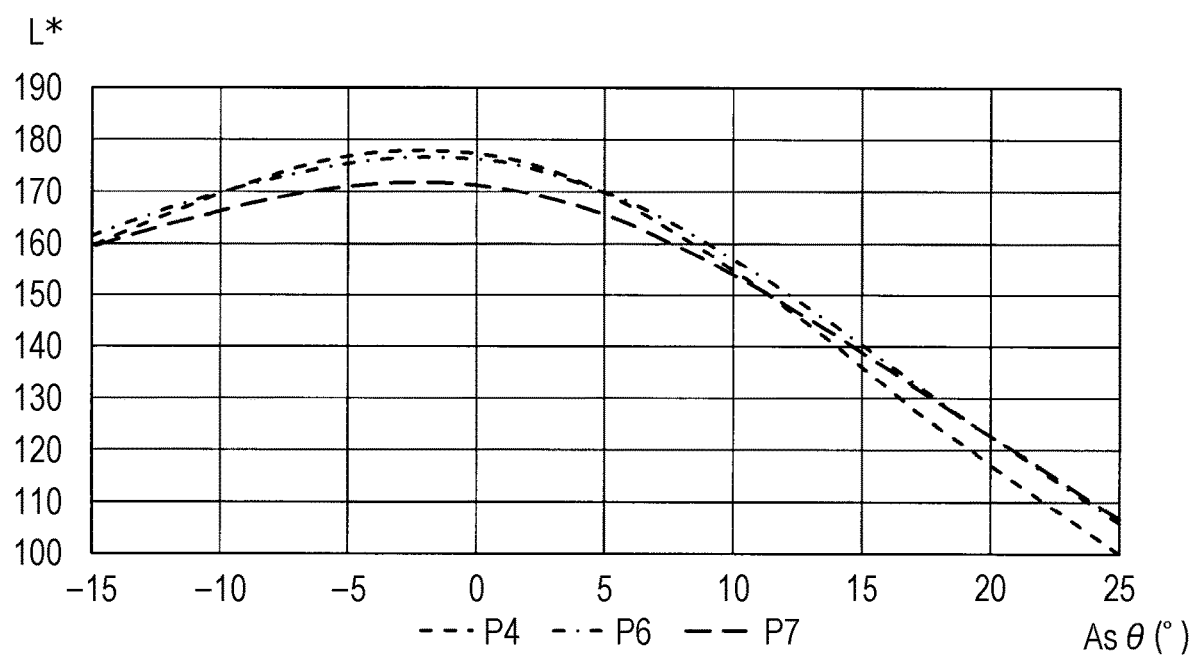
FIG. 8 is a graph illustrating the angular distribution illustrated in FIG. 7 for some samples.

FIG. 7 illustrates the angular distribution (reflection angle characteristics) of the brightness L* for a plurality of samples P1 to P10 having different glittering effect. FIG. 8 illustrates the angular distribution illustrated in FIG. 7 for some of the samples P4, P6, and P7. Note that, it is assumed that the particle size and density of the glittering material are set so that the glittering effect is highest in sample P1, decreases as approaching sample P10, and becomes lowest in sample P10.

As seen in FIGS. 7 and 8, the higher glittering effect the sample has, the higher the brightness L* becomes at As(0°). Further, in a case of a sample with a high brightness L* at As(0°) (a sample with high glittering effect), the distribution of the brightness L* near As(15°) (for example, from As(15°) to As(25°) is steep. $\theta_n$ the other hand, in a sample having a low brightness L* at As(0°) (a sample with low glittering effect), the distribution gradient of the brightness L* near As(15°) tends to be gradual. Using this relationship, the correlation of an index L1 corresponding to the difference between the brightness L*(15°) at As(15°) and the brightness L*(25°) at As(25°), and the brightness $L^*_0$ indicating the actual glittering effect was studied and the following results was obtained.

Figure 9:
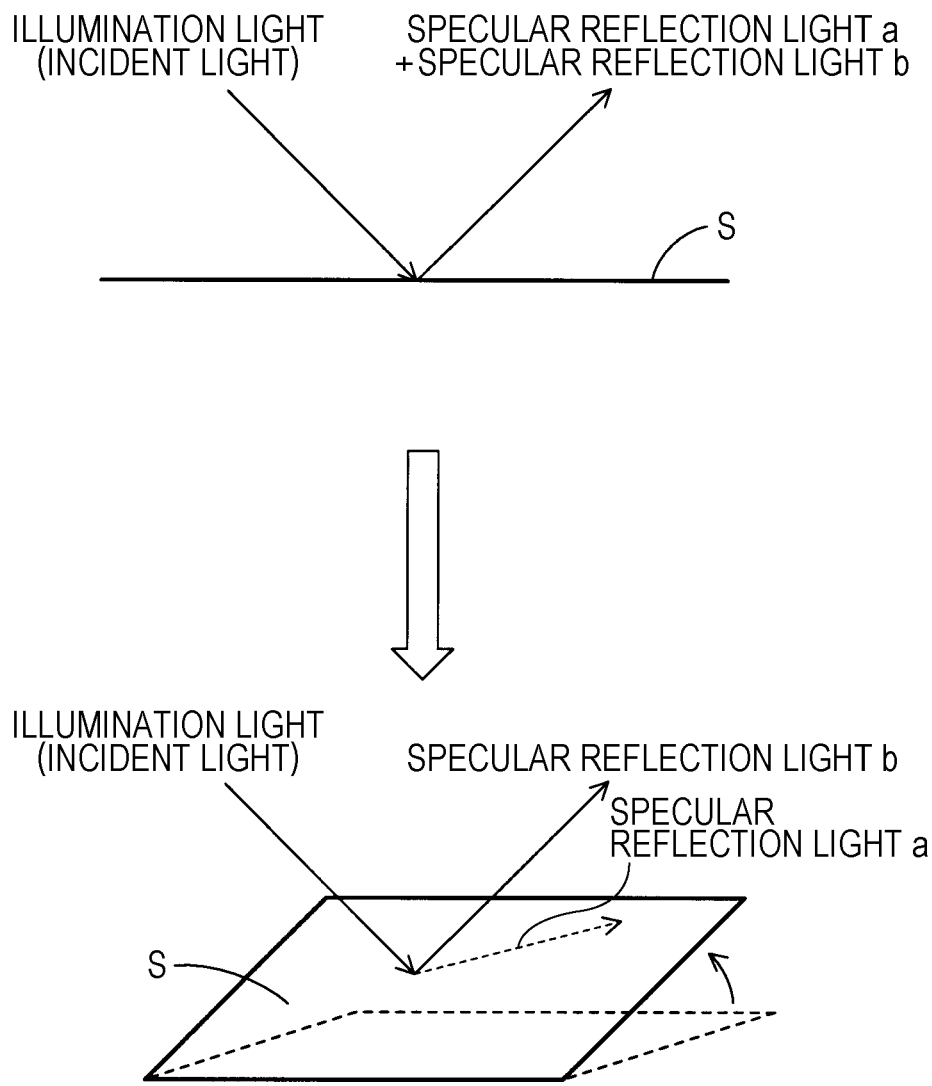
FIG. 9 is an explanatory diagram schematically illustrating a state in which a sample surface is inclined to separate two types of specular reflection light.

The brightness $L^*_0$ is an optical parameter calculated based on the reflectance of the specular reflection light (reflected light of) As(0°) by the glittering material, that is, the reflectance of the specular reflection light b illustrated in FIGS. 4 and 5. For the reflectance of the specular reflection light b can be obtained by referring to the output from the pixel area that receives light that does not include the specular reflection light a by, for example, installing an array sensor in the specular reflection direction and forming an optical system so that light corresponding to the angular distribution from the sample is received by each pixel of the array sensor; however, according to the present embodiment and the later-described embodiments, a value corresponding to the reflectance of the above described specular reflection light b has been obtained with a following method that can achieve an equivalent effect and the effect was verified. In other words, the specular reflection light b has a certain degree of angular distribution different from the specular reflection light a due to the plurality of glittering materials being inclined in various directions. Utilizing this property, as illustrated in FIG. 9, by arranging the surface S of the sample to be irradiated with the illumination light at an angle inclined with respect to the horizontal plane, the specular reflection light a and the specular reflection light b are separated and the value corresponding to the intensity of the specular reflection light b has been obtained by receiving the separated specular reflection light b by the sensor. The brightness $L^*_0$ described below is a value corresponding to the intensity of the specular reflection light b obtained by this method. Note that, since the amount of the diffuse reflection light c on the coating film is generally small, it is considered to be ignorable here.

Figure 10:
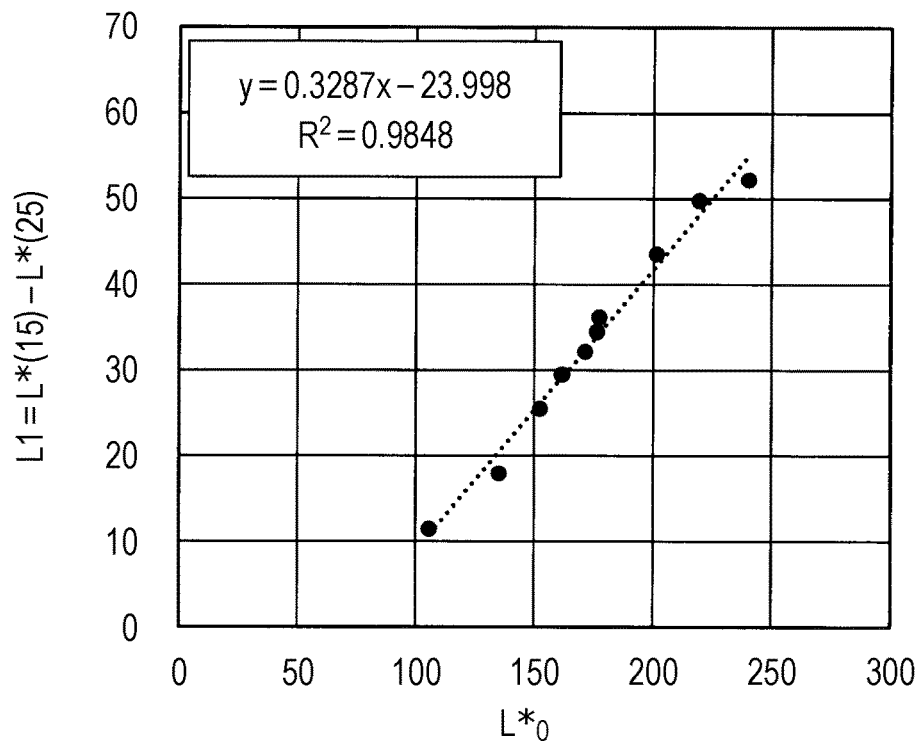
FIG. 10 is an explanatory diagram in which points determined by respective values of indexes corresponding to brightness and glittering effect are plotted on a coordinate plane for a plurality of samples having different glittering effect.

FIG. 10 is a plot of pints determined by the values of the brightness $L^*_0$ and the above-described index L1 (=L*(15°)−L*(25°)), on a coordinate plane, for a plurality of samples having different glittering effect. When a regression line approximating the distribution of each point in the figure is obtained by the least-squares method, y=0.3287x−23.998 was obtained as the regression line, and $R^2$=0.9848 was obtained as the determination coefficient indicating the degree of correlation between the regression line and each point. Note that the determination coefficient $R^2$ is calculated by following Equation 6. Usually, when the determination coefficient $R^2$ is equal to or greater than 0.5, since it is considered that the correlation is high and it can be said that there is a higher correlation between the brightness $L^*_0$ and the index L1, based on the value of the determination coefficient $R^2$. In addition, since the brightness $L^*_0$ indicates an actual glittering effect, it can be said that there is a high correlation between the glittering effect of the glittering material and the index L1.

$$R^2 = \frac{\sum_{i=1}^{n}\{f(xi)-Y\}^2}{\sum_{i=1}^{n}(yi-Y)^2} = 1 - \frac{\sum_{i=1}^{n}\{yi-f(xi)\}^2}{\sum_{i=1}^{n}(yi-Y)^2}$$ [Equation 6]

where
(xi,yi): coordinate data
Y: yi average
f(xi): value of y in regression formula y=f(x) when x=xi Note that, of the light incident on the surface of each sample and reflected, light reflected at an angle close to the specular reflection direction (for example, As(−15°) to As(45°) is referred to as highlight, and light reflected at an angle away from the specular reflection direction (for example, As(75°) to As(110°) is referred to as shade. In the above, the difference between the brightness $L^*(15°)$ at As(15°) and the brightness $L^*(25°)$ at As(25°) is obtained as the index L1, but the two angles are not limited to 15° and 25° as long as the brightness $L^*$ regarding the angle within the highlight range is included.

Figure 11:
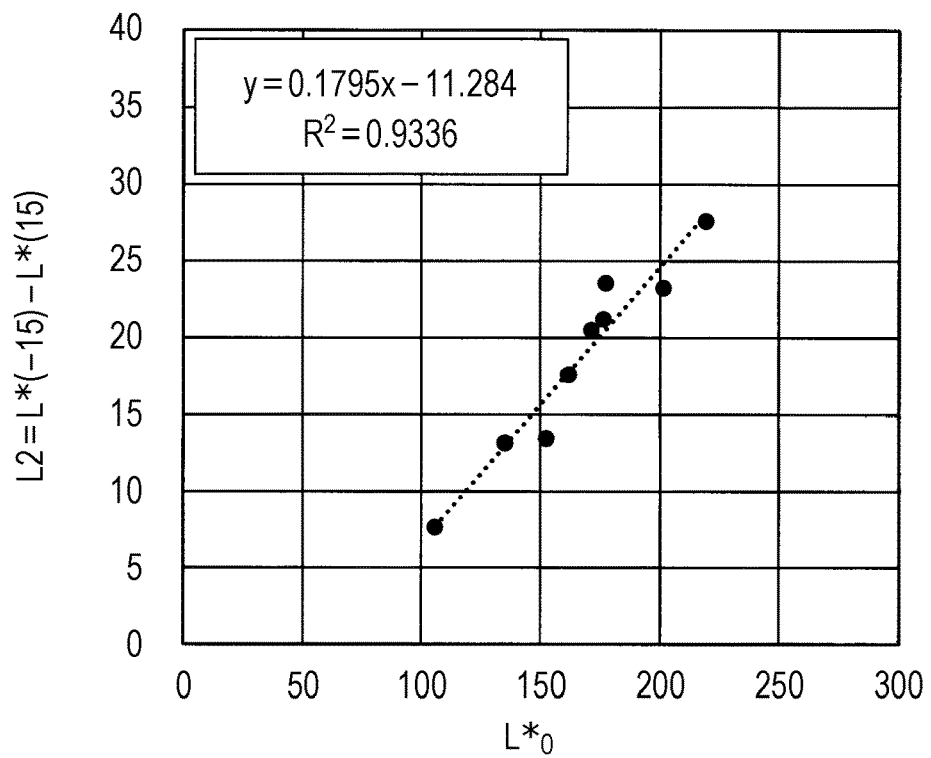
FIG. 11 is an explanatory diagram in which points determined by values of other indexes corresponding to brightness and glittering effect are plotted on a coordinate plane.

FIG. 11 is a plot of points determined by each value of the brightness $L^*_0$ and the index L2 on a coordinate plane for a plurality of samples having different glittering effects. Note that the index L2 is a difference between the brightness $L^*(−15°)$ at As(−15°) and the brightness $L^*(15°)$ at As(15°), that is, $L^*(−15°)−L^*(15°)$. Similarly to the above, when the regression line was obtained by the least-squares method, y=0.1795x−11.284 was obtained as the regression line, and $R^2=0.9336$ was obtained as the determination coefficient. Therefore, it can be said that there is a higher correlation between the brightness $L^*_0$ and the index L2 and that there is a higher correlation between the glittering effect of the glittering material and the index L2, based on the value of the determination coefficient $R^2$.

Figure 12:
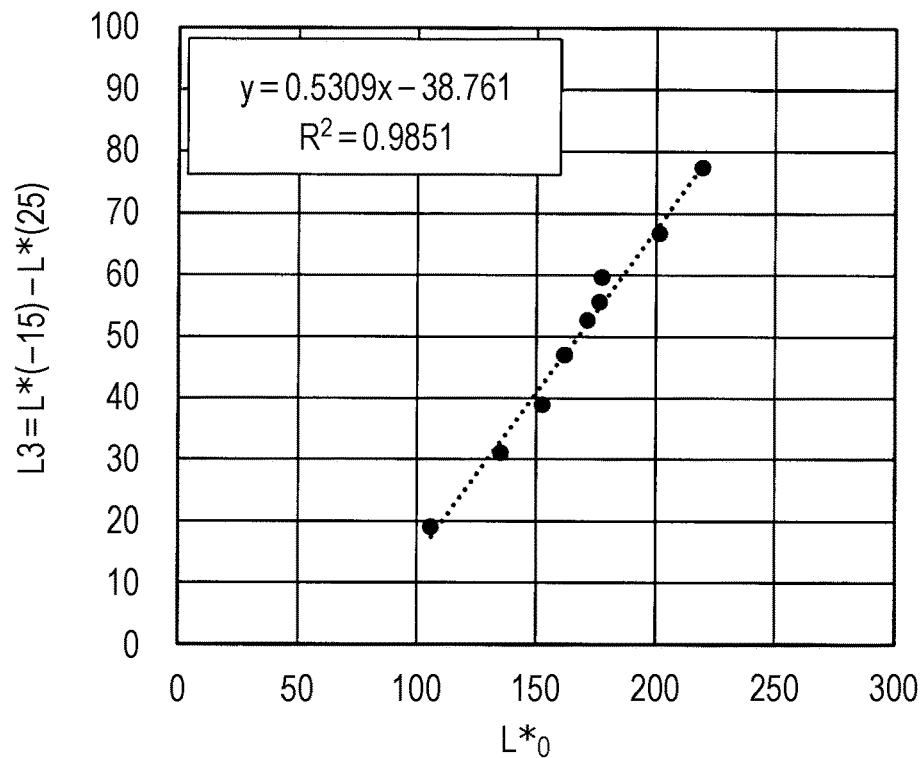
FIG. 12 is an explanatory diagram in which points determined by values of still other indexes corresponding to brightness and glittering effect are plotted on a coordinate plane.

FIG. 12 is a plot of points determined by the values of the brightness $L^*_0$ and the index L3 on a coordinate plane for a plurality of samples having different glittering effects. Note that the index L3 is the difference between the brightness $L^*(−15°)$ at As(−15°) and the brightness $L^*(25°)$ at As(25°), that is, $L^*(−15°)−L^*(25°)$. Similarly to the above, when the regression line was obtained by the least-squares method, y=0.5309x−38.761 was obtained as the regression line, and $R^2=0.9851$ was obtained as the determination coefficient. Therefore, it can be said that there is a higher correlation between the brightness $L^*_0$ and the index L3 and that there is a higher correlation between the glittering effect of the glittering material and the index L3, based on the value of the determination coefficient $R^2$.

Figure 13:
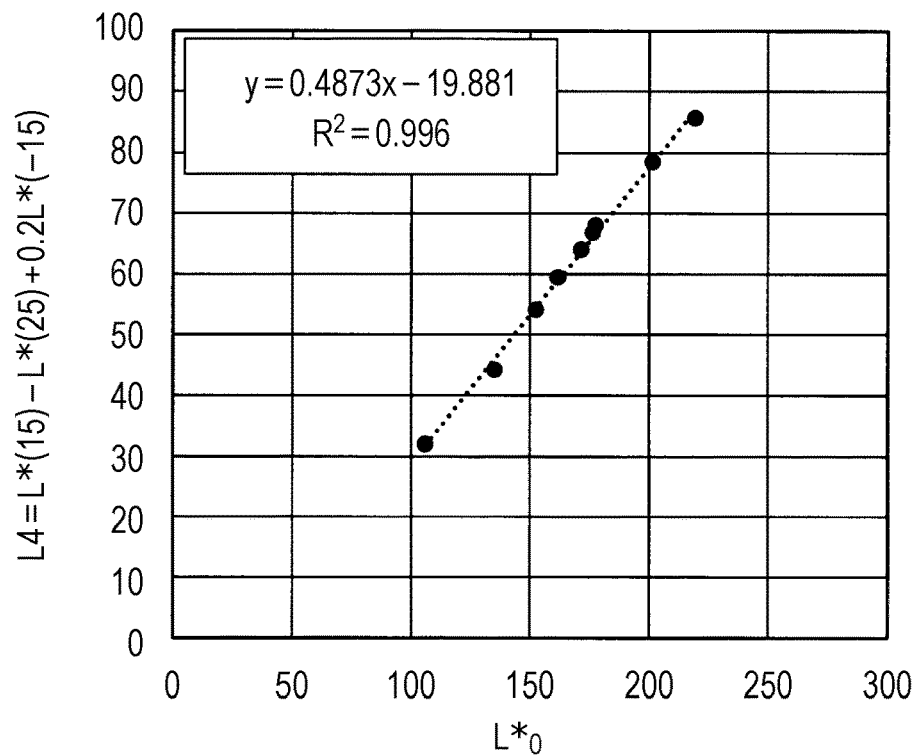
FIG. 13 is an explanatory diagram in which points determined by values of still other indexes corresponding to brightness and glittering effect are plotted on a coordinate plane.

FIG. 13 is a plot of points determined by the values of the brightness $L^*_0$ and the index L4, on a coordinate plane, for a plurality of samples having different glittering effects. Note that the index L4 is the difference between the brightness $L^*(15°)$ at As(15°) and the brightness $L^*(25°)$ at As(25°) added with weighting the brightness $L^*(−15°)$ at As(−15°), more specifically, $L^*(15°)−L^*(25°)+0.2L^*(−15°)$. Similarly to the above, when the regression line was obtained by the least-squares method, y=0.4873x−19.881 was obtained as the regression line, and $R^2=0.996$ was obtained as the determination coefficient. Therefore, it can be said that there is a higher correlation between the brightness $L^*_0$ and the index L4 and that there is a higher correlation between the glittering effect of the glittering material and the index L4, based on the value of the determination coefficient $R^2$.

From the above, in order to obtain an index having a high correlation with the glittering effect of the glittering material, the calculation formula for calculating the above-described index is defined including the difference between the brightness $L^*$ for the two angles of the highlight range, or may be defined by further adding the brightness $L^*$ for other angles in the highlight range, and it can be said that each brightness $L^*$ may be multiplied by a weighting coefficient. In addition, although detailed verification is omitted, it is already known that the calculation formula for calculating the above-described index may be defined by further subtracting a brightness $L^*$ for other angles in the highlight range if the difference between the brightness $L^*$ for the two angles in the highlight range is included.

Further, in the above description, an example has been described in which the brightness $L^*$ of the $L^*a^*b^*$ color system is used to calculate the index corresponding to the particle size of the glittering material; however, as a substitute for the brightness $L^*$, an XYZ stimulus value or a spectral reflectance of the XYZ color system may be used for example. Even in this case, since a high correlation is obtained between the calculated index and the glittering effect of the glittering material, it is also possible to compare the glittering effect of the glittering material with different colors based on the index, for example and the application range of the determination of the glittering effect is further expanded. Note that a more desirable mode of an example using an XYZ stimulus value or a spectral reflectance of the XYZ color system as a substitute for the brightness $L^*$ will be described in a second embodiment described later.

Therefore, from the above, it can be said that an index I (including the indexes L1 to L4) corresponding to the glittering effect of the glittering material may be calculated by the following equation. In other words, the calculation unit 32 as the index calculation unit may calculate the index I represented by the following equation as an index corresponding to the luminance indicating the glittering effect of the glittering material.

$$I=a_1 \cdot I(\theta_1)+a_2 \cdot I(\theta_2)+ \ldots +a_n \cdot I(\theta_n)$$

However, the specular reflection direction is set to 0° in a plane including the incident direction and the specular reflection direction of the principal light beam of the light emitted from the light emitting unit 10 with respect to the object M, and an angle direction inclined as approaching from the specular reflection direction toward the incident direction is defined as the positive direction. Then, a plurality of angles are respectively set to $\theta_1$ to 0 where n is an integer equal to or greater than 2. Here, the angles $\theta_1$ to 0 are angles in the range of 15° to 45°, respectively. In addition, for each of the directions of the angles $\theta_1$ to $\theta_n$, the optical parameters acquired based on the reflected light amount (reflectance) are $I(\theta_1)$ to $I(\theta_n)$, and weighting coefficient for the optical parameters $I(\theta_1)$ to $I(\theta_n)$ are set as $a_1$ to $a_n$, respectively. In addition, regarding the weighting coefficients $a_1$ to $a_n$, one of them is positive, one of them is negative, and the rest is positive, negative, or zero.

From the above considerations, it can be said that the index I (indexes L1 to L4) and the luminance (glittering effect, texture) of the glittering material used for metallic coating or pearl coating have a high correlation and it is possible to evaluate the magnitude of the glittering effect of the glittering material based on the index I. For example, by displaying the calculated index I (numerical value) on the display unit 60, the user can evaluate the magnitude of the glittering effect (luminance) of the glittering material by looking at the index I displayed on the display unit 60. Therefore, instead of using a two-dimensional sensor such as a digital camera, which has been needed in the past, using only the multi-angle colorimeter 1, the texture (the glittering effect in this example) can be evaluated based on the value of the index I in addition to the color evaluation. Therefore, since only the multi-angle colorimeter 1 is used as an apparatus used for evaluating metallic coating and pearl coating (since a two-dimensional sensor such as a digital camera is not needed), increase of the size and cost of the above apparatus can be avoided.

Further, since one of the weighting coefficients $a_1$ to $a_n$ is positive and one of the weighting coefficients is negative, the calculation formula of the index I always includes a term equivalent to the difference between the weights of the optical parameters for two specific angles. Because there is a high correlation between the difference and the glittering effect of the glittering material, by reflecting the difference in the calculation of the index I, the magnitude of the glittering effect (luminance) of the glittering material can be properly evaluated based on the obtained index I (brightness).

Further, as described above, the brightness L* can be obtained by calculation according to the amount of light (reflected light amount) received in the light amount detection unit 20 (the spectral reflectance, tristimulus values XYZ, and L*a*b* can be calculated in order), and is usually used as parameters for color evaluation (evaluation of brightness). Therefore, by using such brightness L* in the calculation of the index I, that is, by setting all the optical parameters $I(\theta_1)$ to $I(\theta_n)$ used in the calculation of the index I as the brightness L*, both color evaluation and texture evaluation can be reliably performed using the multi-angle colorimeter 1.

Note that the light amount detection unit 20 of the multi-angle colorimeter 1 includes a filter having a spectral sensitivity corresponding to the color-matching functions $x(\lambda)$, $y(\lambda)$, and $z(\lambda)$ of the XYZ color system, and has a configuration in which light emitted from the light guide units $21a_2$ to $21f_2$ and transmitted through each filter is detected by each sensor, and an electric signal (an electric signal corresponding to the tristimulus value XYZ) corresponding to the light reception amount is output from each sensor to the control unit 30. In this case, the calculation unit 32 can calculate the brightness L* from the tristimulus values XYZ obtained based on the electric signal and can calculate the index I using the obtained brightness L*.

In addition, in the calculation formulas of the indexes L1 to L3, which are a kind of the index I, there are two angles in the highlight range (n=2) and, regarding the weighting coefficients $a_1$ and $a_2$ of the optical parameter (the brightness L* for example) for the two angles, one of the coefficients is 1 and the other of the coefficients is −1. In this case, since the calculation formula of the index I is easily defined by the difference between the optical parameters for the two angles, the index I can be easily calculated using the minimum necessary optical parameters.

Further, the multi-angle colorimeter 1 of the present embodiment further includes the display unit 60 that displays the index I calculated by the calculation unit 32. Thereby, the user can evaluate the magnitude of the glittering effect (luminance) of the glittering material by looking at the index I displayed on the display unit 60.

Note that, although the above description has been made on the assumption that the index I calculated by the calculation formula is a positive value, the index I may be a negative value. For example, in the calculation formula of the index L1, when the weighting coefficient of L(15°) is "−1" and the weighting coefficient of L(25°) is "+1," the value of the index I1 is negative. In this case, the magnitude of the glittering effect of the glittering material may be evaluated by evaluating the magnitude of the distance of the index (negative value) from the origin (zero).

Note that there is a concept called Flip Flop as a calculation formula for quantifying a change in brightness when the observation angle of the coating is changed, which depends on the orientation and dispersion of the glittering material. In this Flip Flop, a difference in brightness L* between the highlight and the shade is calculated, and the following formula is known as an example.

$$\text{Flop Index} = \frac{2.69(L_{15°}^* - L_{110°}^*)^{1.11}}{(L_{45°}^*)^{0.86}} \quad [\text{Equation 7}]$$

In the above-described conventional calculation formula, the difference in brightness L* between the highlight where specular reflection from the glittering material is dominant (for example, 15°) and the shade where there is almost no specular reflection (for example, 110°) is calculated. $\theta_n$, the other hand, in the present embodiment, for the purpose of obtaining the angle gradient of the brightness obtained based on the reflected light from the glittering material, the angle range used for calculating the brightness difference in the calculation formula is limited to the range of the highlight ($-15° \leq \text{As}\theta \leq 45°$). In this regard, the calculation formula of the present embodiment is significantly different from the conventional calculation formula. It should be noted that the conventional calculation formula does not use an angle gradient of brightness between a plurality of angles of the highlight, so that a high correlation with the glittering effect of the glittering material cannot be obtained.

Second Embodiment

Another embodiment of the present invention will be described below with reference to the drawings. Note that, according to the present embodiment, only the parts different from the first embodiment will be described.

According to the first embodiment, an example has been described in which the brightness L* of the L*a*b* color system is used for calculating the index corresponding to the glittering effect (luminance) of the glittering material. The brightness L* of the L*a*b* color system depends only on the Y value in the XYZ color system, and the Y value largely contributes to the wavelength band corresponding to G (green) in the RGB color system. Therefore, in the visible light wavelength range (for example, 400 to 700 nm), the spectral reflection intensity (spectral reflectance, reflected light amount) near the center (almost G wavelength range) has a large contribution to the brightness L* (being considered to the brightness L*), and the spectral reflection intensity in other wavelength ranges (red and blue wavelength ranges) has a small contribution to the brightness L*.

For this reason, for example, in a case where the comparison of glittering effect between G paint colors and the comparison of glittering effect between achromatic colors (for example, the comparison of glittering effect between white paint and silver paint), even with calculation formula using the brightness L*, there is no problem because the correlation between the index calculated by the calculation formula and the glittering effect can be sufficiently obtained. However, in the comparison of glittering effect between paint colors in a wavelength range (for example, red) where the degree of contribution to the brightness L* is small, and in the comparison of glittering effect between a plurality of different paint colors such as red, green, and blue, there is a possibility that a correlation between the calculated index and the glittering effect may not be sufficiently obtained with a calculation formula using the brightness L*.

Therefore, the inventors of the present application have studied the calculation formula of the index I using optical parameters other than the brightness L* among the optical parameters used for color evaluation. Then, as a result of the studies, a found calculation formula was employed as a calculation formula in the calculation unit 32 of the first embodiment. In other words, the calculation unit 32 calculates the index I represented by the following calculation formulas as an index corresponding to the glittering effect (luminance) of the glittering material.

$$I_1 = a_1 \cdot I'_1(\theta_1) + a_2 \cdot I'_1(\theta_2) + \ldots + a_n \cdot I'_1(\theta_n)$$
$$I_2 = a_1 \cdot I'_2(\theta_1) + a_2 \cdot I'_2(\theta_2) + \ldots + a_n \cdot I'_2(\theta_n)$$
$$\ldots$$
$$I_m = a_1 \cdot I'_m(\theta_1) + a_2 \cdot I'_m(\theta_2) + \ldots + a_n \cdot I'_m(\theta_n)$$
$$I = I_1 + I_2 + \ldots + I_m$$

where, n and m are each an integer equal to or greater than 2, and a plurality of angles are respectively $\theta_1$ to $\theta_n$, and the angles $\theta_1$ to $\theta_n$ are angles within a range of $-15°$ to $45°$, respectively. Further, for each of the directions of the angles $\theta_1$ to $\theta_n$, the optical parameters obtained for each different wavelength band or each different wavelength obtained based on the reflected light amount (reflectance) are respectively represented by $I'_1(\theta_1)$ to $I'_1(\theta_n)$, $I'_2(\theta_n)$ to $I'_2(\theta_n)$, ..., and $I'_m(\theta_1)$ to $I'_m(\theta_n)$, and weighting coefficients of the respective optical parameters $I'_1(\theta_1)$ to $I'_1(\theta_n)$, $I'_2(\theta_1)$ to $I'_2(\theta_n)$, ..., and $I'_m(\theta_1)$ to $I'_m(\theta_n)$ are respectively represented by $a_1$ to $a_n$. In addition, regarding the weighting coefficients $a_1$ to $a_n$, one of them is positive, one of them is negative, and the rest is positive, negative, or zero.

Here, as the above optical parameters $I'_1(\theta_1)$ to $I'_1(\theta_n)$, $I'_2(\theta_1)$ to $I'_2(\theta_n)$, ..., and $I'_m(\theta_1)$ to $I'_m(\theta_n)$, a parameter indicating wavelength dependency can be used and, more specifically, tristimulus values XYZ or spectral reflectance Ref($\lambda,\theta$) at a plurality of wavelengths $\lambda$ can be used. Note that, in this specification, "wavelength dependency" refers to a property in which (optical) characteristics change over a wavelength range of visible light (for example, 400 to 700 nm). Hereinafter, this will be described in more detail.

(A case where the optical parameters are tristimulus values XYZ)

In a case where the optical parameters are tristimulus values XYZ, the above $I'_1(\theta_1)$ to $I'_1(\theta_n)$, $I'_2(\theta_1)$ to $I'_2(\theta_n)$, ..., and $I'_m(\theta_1)$ to $I'_m(\theta_n)$ can be set as $I'_1(\theta_1)$ to $I'_1(\theta_n)$, $I'_2(\theta_1)$ to $I'_2(\theta_n)$, and $I'_3(\theta_1)$ to $I'_3(\theta_n)$ as corresponding to XYZ.

Here, when $I'_1(\theta_1)$ to $I'_1(\theta_n) = X(\theta_1)$ to $X(\theta_n)$ $I'_2(\theta_1)$ to $I'_2(\theta_n) = Y(\theta_1)$ to $Y(\theta_n)$ $I'_3(\theta_1)$ to $I'_3(\theta_n) = Z(\theta_1)$ to $Z(\theta_n)$, $I_1 = I'_x = a_1 \cdot X(\theta_1) + a_2 \cdot X(\theta_2) + \ldots + a_n \cdot X(\theta_n)$ $I_2 = I'_y = a_1 \cdot Y(\theta_1) + a_2 \cdot Y(\theta_2) + \ldots + a_n \cdot Y(\theta_n)$ $I_3 = I'z = a_1 \cdot Z(\theta_1) + a_2 \cdot Z(\theta_2) + \ldots + a_n \cdot Z(\theta_n)$ and $I = I'_x + I'_y + I'_z$.

Here is a specific example:

$$I'_x = X(15°) - X(25°)$$
$$I'_y = Y(15°) - Y(25°)$$
$$I'_z = Z(15°) - Z(25°)$$
$$I = I'_x + I'_y + I'_z = \{X(15°) - X(25°)\} + \{Y(15°) - Y(25°)\} + \{Z(15°) - Z(25°)\}$$

Figure 14:
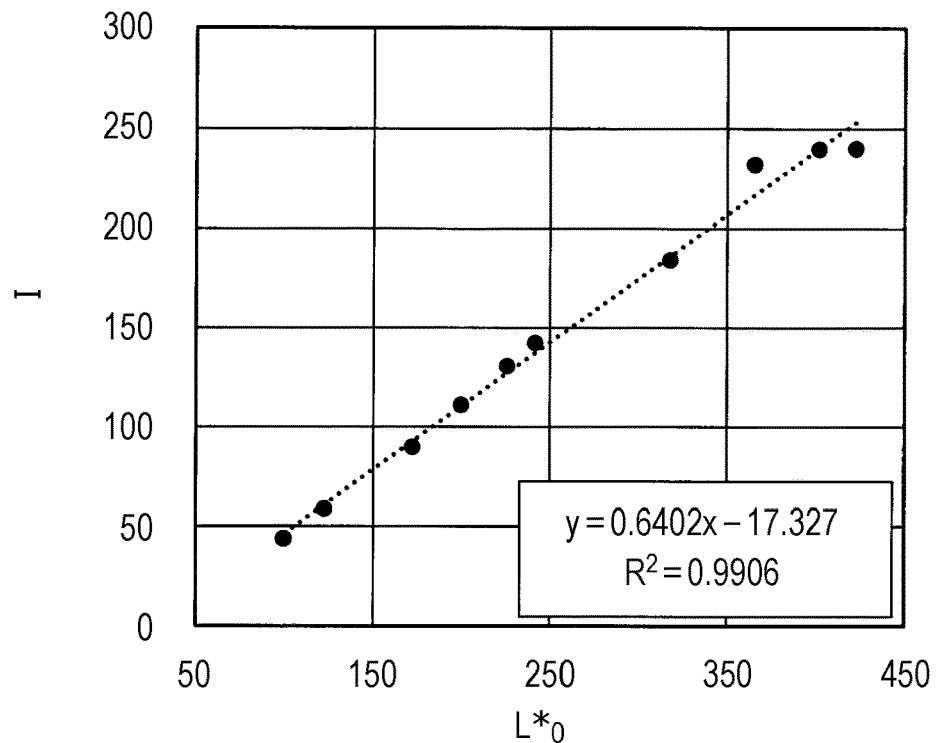
FIG. 14 is an explanatory diagram in which points determined by values of indexes corresponding to brightness and glittering effect are plotted on a coordinate plane according to a second embodiment of the present invention.

FIG. 14 is a plot of points determined by each value of the brightness $L^*_0$ and the index I, on a coordinate plane, for a plurality of samples having different glittering effect of the glittering material. As in the first embodiment, when the regression line was obtained by the least-squares method, y=0.6402x−17.327 was obtained as the regression line, and $R^2$=0.9906 was obtained as the determination coefficient. Therefore, it can be said that there is a high correlation between the brightness $L^*_0$ and the index I, and a high correlation between the glittering effect of the glittering material and the index I, based on the value of the determination coefficient $R^2$.

Here is another specific example:

$$I'_x = X(-15°) - X(25°)$$
$$I'_y = Y(-15°) - Y(25°)$$
$$I'_z = Z(-15°) - Z(25°)$$
$$I = I'_x + I'_y + I'_z = \{X(-15°) - X(25°)\} + \{Y(-15°) - Y(25°)\} + \{Z(-15°) - Z(25°)\}$$

Figure 15:
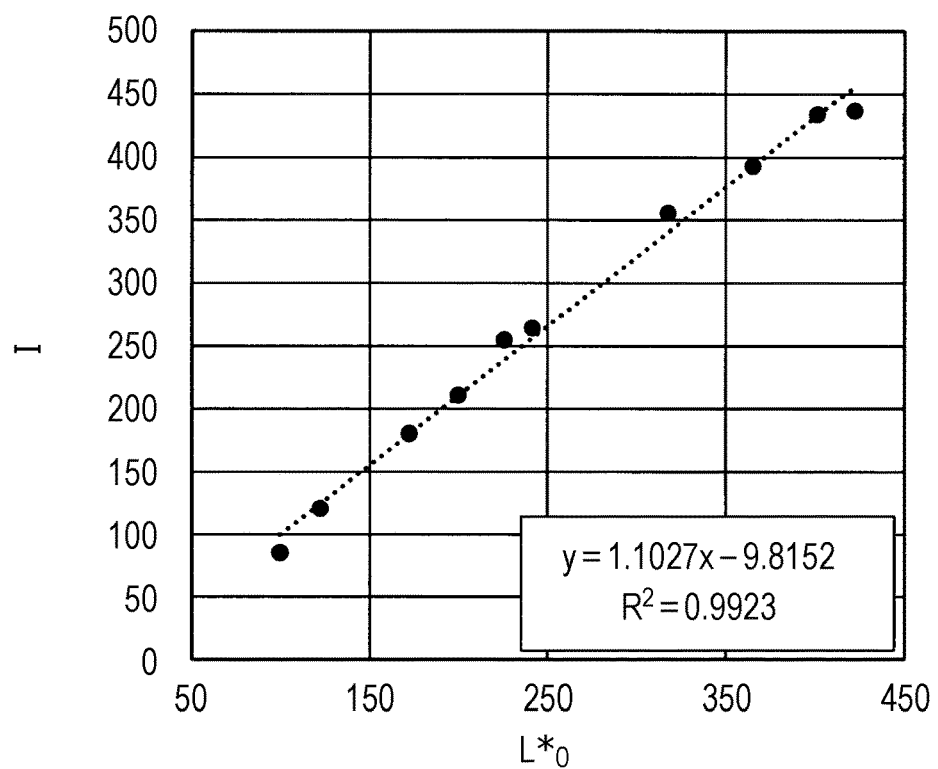
FIG. 15 is an explanatory diagram in which points determined by values of other indexes corresponding to brightness and glittering effect are plotted on a coordinate plane.

FIG. 15 is a plot of points determined by each value of the brightness $L^*_0$ and the index I, on a coordinate plane, for a plurality of samples having different glittering effect of the glittering material. As in the first embodiment, when the regression line was obtained by the least-squares method, y=1.1027x−9.8152 was obtained as the regression line, and $R^2$=0.9923 was obtained as the determination coefficient. Therefore, it can be said that there is a high correlation between the brightness $L^*_0$ and the index I, and a high correlation between the glittering effect of the glittering material and the index I, based on the value of the determination coefficient $R^2$.

Since the tristimulus values XYZ almost correspond to the RGB colors perceived by the human eye, by setting a calculation formula of the index I using the tristimulus values XYZ for each angle as optical parameters, an index I having a high correlation with the glittering effect of the glittering material over the entire visible light wavelength range can be calculate based on the calculation formula. With this configuration, the magnitude of the glittering effect can be appropriately evaluated based on the calculated index I even in a case of performing comparison glittering effect between paint colors in the wavelength range where the contribution to the brightness L* is small (for example, between red paint colors or between blue paint colors), or comparison of glittering effect between a plurality of different paint colors (for example, between a red paint color and a blue paint color).

(A case where the optical parameter is the spectral reflectance)

In a case where the optical parameter is the spectral reflectance Ref($\lambda,\theta$) at a plurality of wavelengths $\lambda$, the above $I'_1(\theta_1)$ to $I'_1(\theta_n)$, $I'_2(\theta_1)$ to $I'_2(\theta_n)$, ..., and $I'_m(\theta_1)$ to $I'_m(\theta_n)$ can be expressed as $I'_1(\theta_1)$ to $I'_1(\theta_n)$=Ref($\lambda_1,\theta_1$) to Ref($\lambda_1,\theta_n$)

$I'_2(\theta_1)$ to $I'_2(\theta_n)$=Ref($\lambda_2,\theta_1$) to Ref($\lambda_2,\theta_n$) ...

$I'_m(\theta_1)$ to $I'_m(\theta_n)$=Ref($\lambda_m,\theta_1$) to Ref($\lambda_m,\theta_n$)

where a plurality of wavelengths $\lambda$ are $\lambda_1, \lambda_2, \ldots, \lambda_m$. In this case, $I_1 = a_1 \cdot \text{Ref}(\lambda_1,\theta_1) + a_2 \cdot \text{Ref}(\lambda_1,\theta_2) + \ldots + a_n \cdot \text{Ref}(\lambda_1,\theta_n)$ $I_2 = a_1 \cdot \text{Ref}(\lambda_2,\theta_1) + a_2 \cdot \text{Ref}(\lambda_2,\theta_2) + \ldots + a_n \cdot \text{Ref}(\lambda_2,\theta_n)$ ...

$I_m = a_1 \cdot \text{Ref}(\lambda_m,\theta_1) + a_2 \cdot \text{Ref}(\lambda_m,\theta_2) + \ldots + a_n \cdot \text{Ref}(\lambda_m,\theta_n)$ and $I = I_1 + I_2 + \ldots + I_m$.

As a specific example, in a case where wavelengths of every 10 nm in the range of 400 to 700 nm of visible light are considered as the plurality of wavelengths $\lambda$, the index I can be calculated as follows.

Figure 16:
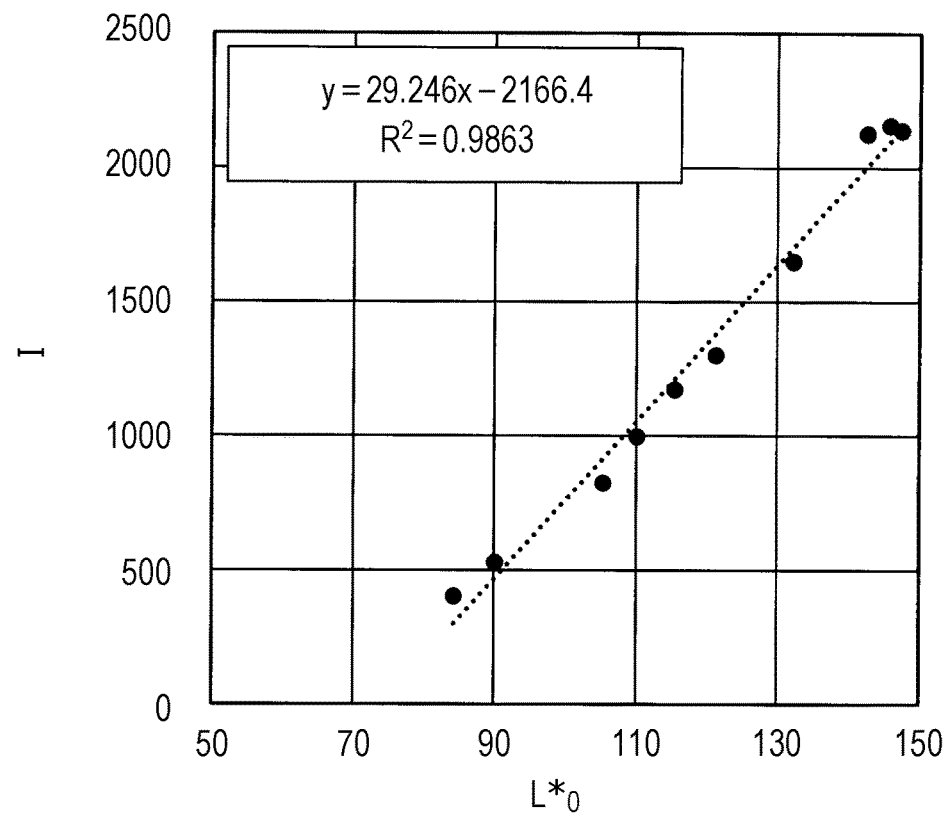
FIG. 16 is an explanatory diagram in which points determined by values of still other indexes corresponding to brightness and glittering effect are plotted on a coordinate plane.

$I_1 = Ref(400 \text{ nm}, 15°) - Ref(400 \text{ nm}, 25°)$
$I_2 = Ref(410 \text{ nm}, 15°) - Ref(410 \text{ nm}, 25°)$
...
$I_{31} = Ref(700 \text{ nm}, 15°) - Ref(700 \text{ nm}, 25°)$ $I = I_1 + I_2 + \ldots + I_{31}$ FIG. 16 is a plot of points determined by each value of the brightness $L^*_0$ and the index I, on a coordinate plane, for a plurality of samples having different glittering effect of the glittering material. As in the first embodiment, when the regression line was obtained by the least-squares method, y=29.246x−2166.4 was obtained as the regression line, and $R^2$=0.9863 was obtained as the determination coefficient. Therefore, it can be said that there is a high correlation between the brightness $L^*_0$ and the index I, and a high correlation between the glittering effect of the glittering material and the index I, based on the value of the determination coefficient $R^2$.

By setting a calculation formula of the index I using the spectral reflectance Ref($\lambda,\theta$) for each wavelength $\lambda$ and each angle as optical parameters, an index I having a high correlation with the glittering effect of the glittering material over the entire visible light wavelength range can be calculate based on the calculation formula. Therefore, as in the case where the tristimulus values XYZ are used as the optical parameters, the magnitude of the glittering effect can be appropriately evaluated based on the calculated index I even in a case of performing comparison glittering effect between paint colors in the wavelength range where the contribution to the brightness L* is small, or comparison of glittering effect between a plurality of different paint colors.

Note that, even when using the tristimulus values as the optical parameters or even when spectral reflectance is used, the same multi-angle colorimeter 1 can be used to evaluate not only color but also glittering effect, so that increase in the size and cost of an apparatus used for evaluating metallic coating and pearl coating can be avoided as in the first embodiment.

Third Embodiment

The following will describe still another embodiment of the present invention with reference to the drawings. Note that, according to the present embodiment, only the parts different from the first and second embodiments will be described.

The inventors of the present application have further studied the calculation formula of the index I, and have found a calculation formula of the index I using a plurality of optical parameters. Then, the above calculation formula was set as a calculation formula used in the calculation unit 32 of the first embodiment. In other words, the calculation unit 32 calculates the index I represented by the following calculation formulas as an index corresponding to the glittering effect (luminance) of the glittering material.

$I_1 = [\{a_1 \cdot J_1(\theta_1) + a_2 \cdot J_1(\theta_2) + \ldots + a_n \cdot J_1(\theta_n)\} /$
$\{b_1 \cdot J_1(\theta_1) + b_2 \cdot J_1(\theta_2) + \ldots + b_n \cdot J_1(\theta_n)\}] \cdot K_1(\theta_P)$ $I_2 = [\{a_1 \cdot J_2(\theta_1) + a_2 \cdot J_2(\theta_2) + \ldots + a_n \cdot J_2(\theta_n)\} /$
$\{b_1 \cdot J_2(\theta_1) + b_2 \cdot J_2(\theta_2) + \ldots + b_n \cdot J_2(\theta_n)\}] \cdot K_2(\theta_P)$

...

$I_m = [\{a_1 \cdot J_m(\theta_1) + a_2 \cdot J_m(\theta_2) + \ldots + a_n \cdot J_m(\theta_n)\} /$
$\{b_1 \cdot J_m(\theta_1) + b_2 \cdot J_m(\theta_2) + \ldots + b_n \cdot J_m(\theta_n)\}] \cdot K_m(\theta_P)$ $I = I_1 + I_2 + \ldots + I_m$ where, it is assumed that n and m are each an integer equal to or greater than 2, and a plurality of angles are respectively $\theta_1$ to $\theta_n$, and the angles $\theta_1$ to $\theta_n$ are angles within a range of −15° to 45°, respectively. Further, for each of the directions of the angles $\theta_1$ to $\theta_n$, the optical parameters obtained based on the reflected light amount (reflectance) are two types of $J(\theta)$ and $K(\theta)$, respectively, where at least one of $J(\theta)$ and $K(\theta)$ has wavelength dependency. Furthermore, $J(\theta)=J_1(\theta_1)$ to $J_1(\theta_n), J_2(\theta_1)$ to $J_2(\theta_n), \ldots J_m(\theta_1)$ to $J_m(\theta_n)$, $K(\theta)=K_1(\theta_P), K_2(\theta_P), \ldots K_m(\theta_P)$, where P is any integer from 1 to n. Further, when the weighting coefficient of each optical parameter $J(\theta)$ are two types of $a_1$ to $a_n$ and $b_1$ to $b_n$, one of the weighting factors $a_1$ to $a_n$ is positive, and one is negative and the rest is positive, negative, or zero. Each of the weighting coefficients $b_1$ to $b_n$ is either positive, negative, or zero, except when all of them are zero.

Here, as $J(\theta)$, for example, the tristimulus value XYZ or the spectral reflectance Ref($\lambda,\theta$) used in the second embodiment can be used. Further, as $K(\theta)$, for example, the brightness L* used in the first embodiment can be used.

As an example, when $J(\theta)$ is a tristimulus value XYZ and $K(\theta)$ is brightness L*, the index I can be calculated as follows. In other words, the calculation unit 32 calculates the index I represented by the following calculation formulas as an index corresponding to the glittering effect (luminance) of the glittering material.

$$I_1 = I'_x = [\{X(-15°) - X(25°)\}/X(15°)]L^*(15°)$$

$$I_2 = I'_y = [\{Y(-15°) - Y(25°)\}/Y(15°)]L^*(15°)$$

$$I_3 = I'_z = [\{Z(-15°) - Z(25°)\}/Z(15°)]L^*(15°)$$

$$I = I'_x + I'_y + I'_z$$

Figure 17:
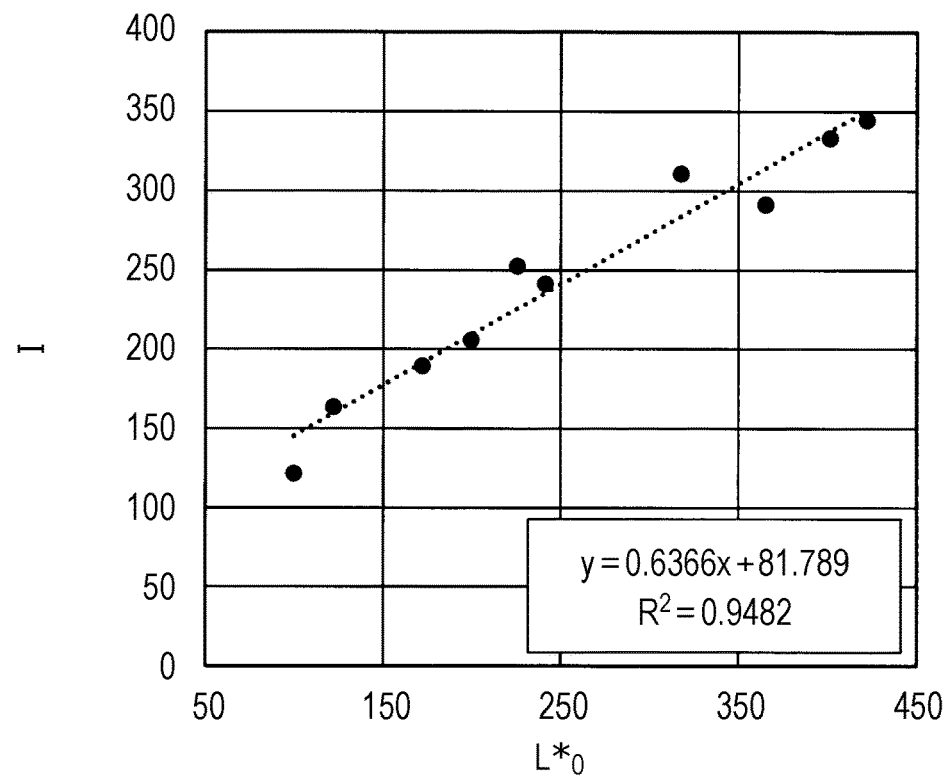
FIG. 17 is an explanatory diagram in which points determined by values of indexes corresponding to brightness and glittering effect are plotted on a coordinate plane according to a third embodiment of the present invention.

FIG. 17 is a plot of points determined by each value of the brightness $L^*_0$ and the index I on a coordinate plane for a plurality of samples having different glittering effect of the glittering material. As in the first embodiment, when the regression line was obtained by the least-squares method, y=0.6366x+81.789 was obtained as the regression line, and $R^2$=0.9482 was obtained as the determination coefficient. Therefore, it can be said that there is a high correlation between the brightness $L^*_0$ and the index I, and a high correlation between the glittering effect of the glittering material and the index I, based on the value of the determination coefficient $R^2$.

In a case where, as in the present embodiment, one of the two types of optical parameters $J(\theta)$ and $K(\theta)$ used in the calculation formula of the index I has wavelength dependency, an index I having a high correlation with the glittering effect of the glittering material over the entire visible light wavelength range can be calculated as in the second embodiment. Therefore, as in the second embodiment, the magnitude of the glittering effect can be appropriately evaluated based on the calculated index I even in a case of performing comparison glittering effect between paint colors in the wavelength range where the contribution to the brightness $L^*$ is small, or comparison of glittering effect between a plurality of different paint colors. In addition, since the glittering effect can be evaluated based on the calculated index I using only the multi-angle colorimeter 1 without separately using a device such as a two-dimensional CCD sensor, which has been conventionally required, it is possible to avoid an increase in the size and cost of an apparatus used for evaluating metallic coating and pearl coating (color evaluation and texture evaluation).

Further, in the present embodiment, since each of the weighting coefficients $b_1$ to $b_n$ of the optical parameter $K(\theta)$ of the denominator of the calculation formula of the index I is 1, the denominator becomes a simple sum (integral value) of the optical parameters $K(\theta)$ for a plurality of angles. This facilitates the calculation of $I_1$ to $I_m$ and the index I using the same.

Note that each of the weighting coefficients $b_1$ to $b_n$ may be a positive value other than 1, a negative value, or zero, except when all are zero (because the denominator of the calculation formula becomes zero and this causes the index I infinite).

Note that, although detailed verification is omitted, it has been confirmed that an index I having a high correlation with the glittering effect of the glittering material can be calculated over the entire visible light wavelength range even in a case where, of $J(\theta)$ and $K(\theta)$, only $K(\theta)$, or both $J(\theta)$ and $K(\theta)$ are optical parameters having wavelength dependency. Therefore, when at least one of $J(\theta)$ and $K(\theta)$ is an optical parameter having wavelength dependency, it can be said that an index I having a high correlation with the glittering effect of the glittering material is calculated over the entire visible light wavelength range and the magnitude of the glittering effect can be appropriately evaluated based on the index I.

In particular, as in the present embodiment, since $J(\theta)$ is a tristimulus value XYZ, and $K(\theta)$ is brightness $L^*$, the index I having the high correlation with the glittering effect of the glittering material over the entire visible light wavelength range can be reliably calculated. In addition, the general formula of the index I when $J(\theta)$ is a tristimulus value XYZ and $K(\theta)$ is brightness $L^*$ is as follows:

$$I_1 = [\{a_1 \cdot X(\theta_1) + a_2 \cdot X(\theta_2) + \ldots + a_n \cdot X(\theta_n)\}/\{b_1 \cdot X(\theta_1) + b_2 \cdot X(\theta_2) + \ldots + b_n \cdot X(\theta_n)\}] \cdot L^*(\theta_P)$$

$$I_2 = [\{a_1 \cdot Y(\theta_1) + a_2 \cdot Y(\theta_2) + \ldots + a_n \cdot Y(\theta_n)\}/\{b_1 \cdot Y(\theta_1) + b_2 \cdot Y(\theta_2) + \ldots + b_n \cdot Y(\theta_n)\}] L^*(\theta_P)$$

$$I_3 = [\{a_1 \cdot Z(\theta_1) + a_2 \cdot Z(\theta_2) + \ldots + a_n \cdot Z(\theta_n)\}/\{b_1 \cdot Z(\theta_1) + b_2 \cdot Z(\theta_2) + \ldots + b_n \cdot Z(\theta_n)\}] \cdot L^*(\theta_P)$$

$$I = +I_1 + I_2 + I_3$$

[Others]

The multi-angle colorimeter described in each of the above embodiments can also be expressed as follows.

In other words, the multi-angle colorimeter described above includes a light emitting unit that emits light onto an object, a light amount detection unit that receives the light emitted from the light emitting unit and reflected by the object in a plurality of directions of angles, and detects a reflected light amount in each of the angles, and an index calculation unit that obtains optical parameters, which are used in color evaluation of metallic coating or pearl coating on a surface of the object, based on the reflected light amount, and calculates, using the optical parameters, an index corresponding to luminance of a glittering material used in the metallic coating or the pearl coating, in which the index calculation unit calculates an index I expressed by a following equation, as the index corresponding to the luminance of the glittering material, when the specular reflection direction is 0° in a plane including an incident direction and a specular reflection direction of a principal light beam of the light emitted from the light emitting unit with respect to the object, and an angle direction inclined from the specular reflection direction toward the incident direction is defined as a positive direction, n is an integer equal to or greater than 2, the plurality of angles are respectively set to $\theta_1$ to $\theta_n$, in which the angles $\theta_1$ to $\theta_n$ are angles within a range of −15° to 45° respectively, the optical parameters obtained for direction of respective angles $\theta_1$ to $\theta_n$ based on the reflected light amount are $I(\theta_1)$ to $I(\theta_n)$ respectively, and weighting coefficients of the respective optical parameters $I(\theta_1)$ to $I(\theta_n)$ are $a_1$ to $a_n$ respectively, $$I = a_1 I(\theta_1) + a_2 I(\theta_2) + \ldots + a_n I(\theta_n)$$

where regarding the weighting coefficients $a_1$ to $a_n$, one is positive, another is negative, and rest is positive, negative, or zero.

In the above-described multi-angle colorimeter, the optical parameters $I(\theta_1)$ to $I(\theta_n)$ are all brightness $L^*$.

The multi-angle colorimeter described above includes a light emitting unit that emits light onto an object, a light amount detection unit that receives light emitted from the light emitting unit and reflected by the object in a plurality of directions of angles, and detects a reflected light amount in each of the angles, and an index calculation unit that obtains optical parameters, which is used in color evaluation of metallic coating or pearl coating on a surface of the object, based on the reflected light amount, and calculates, using the optical parameters, an index corresponding to luminance of a glittering material used in the metallic coating or the pearl coating, in which the index calculation unit calculates an index I expressed by a following equation, as the index corresponding to the luminance of the glittering material, the specular reflection direction is 0° when in a plane including an incident direction and a specular reflection direction of a principal light beam of the light emitted from the light emitting unit with respect to the object, and an angle direction inclined from the specular reflection direction toward the incident direction is defined as a positive direction, n and m are respectively an integer equal to or greater than 2, the plurality of angles are respectively set to $\theta_1$ to $\theta_n$, in which the angles $\theta_1$ to $\theta_n$ are angles within a range of −15° to 45° respectively, the optical parameters obtained for direction of respective angles $\theta_1$ to $\theta_n$ based on the reflected light amount are $I'_1(\theta_1)$ to $I'_1(\theta_n)$, $I'_2(\theta_1)$ to $I'_2(\theta_n)$, ... $I'_m(\theta_1)$ to $I'_m(\theta_n)$ for each different wavelength band or each different wavelength, respectively, and weighting coefficients of the respective optical parameters $I'_1(\theta_1)$ to $I'_1(\theta_n)$, $I'_2(\theta_1)$ to $I'_m(\theta_1)$ to $I'_m(\theta_n)$ are $a_1$ to $a_n$ respectively, $$I_1 = a_1 \cdot I'_1(\theta_1) + a_2 \cdot I'_1(\theta_2) + \ldots + a_n \cdot I'_1(\theta_n)$$
$$I_2 = a_1 \cdot I'_2(\theta_1) + a_2 \cdot I'_2(\theta_2) + \ldots + a_n \cdot I'_2(\theta_n)$$
$$\ldots$$
$$I_m = a_1 \cdot I'_m(\theta_1) + a_2 \cdot I'_m(\theta_2) + \ldots + a_n \cdot I'_m(\theta_n)$$
$$I = I_1 + I_2 + \ldots + I_m$$

where regarding the weighting coefficients $a_1$ to $a_n$, one is positive, another is negative, and rest is positive, negative, or zero.

In the above multi-angle colorimeter, the optical parameters are tristimulus values XYZ, and
when $$I'_1(\theta_1) \text{ to } I'_1(\theta_n) = X(\theta_1) \text{ to } X(\theta_n)$$
$$I'_2(\theta_1) \text{ to } I'_2(\theta_n) = Y(\theta_1) \text{ to } Y(\theta_n)$$
$$I'_3(\theta_1) \text{ to } I'_3(\theta_n) = Z(\theta_1) \text{ to } Z(\theta_n),$$
$$I_1 = I'_x = a_1 \cdot X(\theta_1) + a_2 \cdot X(\theta_2) + \ldots + a_n \cdot X(\theta_n)$$
$$I_2 = I'_y = a_1 \cdot Y(\theta_1) + a_2 \cdot Y(\theta_2) + \ldots + a_n \cdot Y(\theta_n)$$
$$I_3 = I'_z = a_1 \cdot Z(\theta_1) + a_2 \cdot Z(\theta_2) + \ldots + a_n \cdot Z(\theta_n)$$

and $$I = I'_x + I'_y + I'_z.$$

In the above multi-angle colorimeter, the optical parameters are spectral reflectance $Ref(\lambda,\theta)$ of the plurality of wavelengths $\lambda$,
when $$I'_1(\theta_1) \text{ to } I'_1(\theta_n) = Ref(\lambda_1, \theta_1) \text{ to } Ref(\lambda_1, \theta_n)$$
$$I'_2(\theta_1) \text{ to } I'_2(\theta_n) = Ref(\lambda_2, \theta_1) \text{ to } Ref(\lambda_2, \theta_n)$$
$$\ldots$$
$$I'_m(\theta_1) \text{ to } I'_m(\theta_n) = Ref(\lambda_m, \theta_1) \text{ to } Ref(\lambda_m, \theta_n),$$

where the plurality of wavelengths $\lambda$ are $\lambda_1, \lambda_2, \ldots \lambda_m$, $$I_1 = a_1 \cdot Ref(\lambda_1, \theta_1) + a_2 \cdot Ref(\lambda_1, \theta_2) + \ldots + a_n \cdot Ref(\lambda_1, \theta_n)$$
$$I_2 = a_1 \cdot Ref(\lambda_2, \theta_1) + a_2 \cdot Ref(\lambda_2, \theta_2) + \ldots + a_n \cdot Ref(\lambda_2, \theta_n)$$
$$\ldots$$
$$I_m = a_1 \cdot Ref(\lambda_m, \theta_1) + a_2 \cdot Ref(\lambda_m, \theta_2) + \ldots + a_n \cdot Ref(\lambda_m, \theta_n),$$

and $$I = I_1 + I_2 + \ldots + I_m.$$

In the above multi-angle colorimeter, n=2, and regarding the weighting coefficients $a_1$ and $a_2$, one is 1 and other one is −1.

The multi-angle colorimeter described above includes a light emitting unit that emits light onto an object, a light amount detection unit that receives light emitted from the light emitting unit and reflected by the object in a plurality of directions of angles, and detects a reflected light amount in each of the angles, and an index calculation unit that obtains optical parameters, which is used in color evaluation of metallic coating or pearl coating on a surface of the object, based on the reflected light amount, and calculates, using the optical parameters, an index corresponding to luminance of a glittering material used in the metallic coating or the pearl coating, in which the index calculation unit calculates an index I expressed by a following equation, as the index corresponding to the luminance of the glittering material, when the specular reflection direction is 0° in a plane including an incident direction and a specular reflection direction of a principal light beam of the light emitted from the light emitting unit with respect to the object, and an angle direction inclined from the specular reflection direction toward the incident direction is defined as a positive direction, n and m are respectively an integer equal to or greater than 2, the plurality of angles are respectively set to $\theta_1$ to $\theta_n$, in which the angles $\theta_1$ to $\theta_n$ are angles within a range of −15° to 45° respectively, the optical parameters obtained for direction of respective angles $\theta_1$ to $\theta_n$ based on the reflected light amount are two types of $J(\theta)$ and $K(\theta)$ where at least one of $J(\theta)$ and $K(\theta)$ has wavelength dependency, $J(\theta) = J_1(\theta_1)$ to $J_1(\theta_n)$, $J_2(\theta_1)$ to $J_2(\theta_n)$, ... $J_m(\theta_1)$ to $J_m(\theta_n)$, $K(\theta) = K_1(\theta_P)$, $K_2(\theta_P)$, ..., $K_m(\theta_P)$, where P is an integer of any one of 1 to n, and the weighting coefficients of the respective optical parameter $J(\theta)$ are respectively two type of $a_1$ to $a_n$ and $b_1$ to $b_n$, $$I_1 = [\{a_1 \cdot J_1(\theta_1) + a_2 \cdot J_1(\theta_2) + \ldots + a_n \cdot J_1(\theta_n)\} / \{b_1 \cdot J_1(\theta_1) + b_2 \cdot J_1(\theta_2) + \ldots + b_n \cdot J_1(\theta_n)\}] \cdot K_1(\theta_P)$$
$$I_2 = [\{a_1 \cdot J_2(\theta_1) + a_2 \cdot J_2(\theta_2) + \ldots + a_n \cdot J_2(\theta_n)\} / \{b_1 \cdot J_2(\theta_1) + b_2 \cdot J_2(\theta_2) + \ldots + b_n \cdot J_2(\theta_n)\}] \cdot K_2(\theta_P)$$
$$\ldots$$
$$I_m = [\{a_1 \cdot J_m(\theta_1) + a_2 \cdot J_m(\theta_2) + \ldots + a_n \cdot J_m(\theta_n)\} / \{b_1 \cdot J_m(\theta_1) + b_2 \cdot J_m(\theta_2) + \ldots + b_n \cdot J_m(\theta_n)\}] \cdot K_m(\theta_P)$$
$$I = I_1 + I_2 + \ldots + I_m$$

where regarding the weighting coefficients $a_1$ to $a_n$, one is positive, another is negative, and rest is positive, negative, or zero, and the respective weighting coefficients $b_1$ to $b_n$ are any of positive, negative, and zero, except a case where all are zero.

In the above multi-angle colorimeter, $J(\theta)$ is tristimulus values XYZ, and $K(\theta)$ is brightness L*, $$I_1 = [\{a_1 \cdot X(\theta_1) + a_2 \cdot X(\theta_2) + \ldots + a_n \cdot X(\theta_n)\} / \{b_1 \cdot X(\theta_1) + b_2 \cdot X(\theta_2) + \ldots + b_n \cdot X(\theta_n)\}] \cdot L^*(\theta_P)$$

$$I_2 = [\{a_1 \cdot Y(\theta_1) + a_2 \cdot Y(\theta_2) + \ldots + a_n \cdot Y(\theta_n)\} / \{b_1 \cdot Y(\theta_1) + b_2 \cdot Y(\theta_2) + \ldots + b_n \cdot Y(\theta_n)\}] \cdot L^*(\theta_P)$$

$$I_3 = [\{a_1 \cdot Z(\theta_1) + a_2 \cdot Z(\theta_2) + \ldots + a_n \cdot Z(\theta_n)\} / \{b_1 \cdot Z(\theta_1) + b_2 \cdot Z(\theta_2) + \ldots + b_n \cdot Z(\theta_n)\}] \cdot L^*(\theta_P)$$

$$I = +I_1 + I_2 + I_3.$$

In the above multi-angle colorimeter, each of the weighting coefficients $b_1$ to IN, is 1.

The above-described multi-angle colorimeter may further include a display unit that displays the index I calculated by the index calculation unit.

The embodiments of the present invention have been described; however, the scope of the present invention is not limited to the embodiments, and can be extended or modified without departing from the gist of the invention.

INDUSTRIAL APPLICABILITY

The present invention is applicable to a multi-angle colorimeter used for color evaluation of metallic coating or pearl coating in the field of industrial products such as automobiles.

REFERENCE SIGNS LIST

1 Multi-angle colorimeter
10 Light emitting unit
20 Light amount detection unit
32 Calculation unit (Index calculation unit)
60 Display unit
M Object

The invention claimed is:

1. A multi-angle colorimeter, comprising:
a light emitter that emits light onto an object;
a light amount detection unit that receives the light emitted from the light emitter and reflected by the object in a plurality of directions of angles, and detects a reflected light amount in each of the angles; and
a hardware processor that obtains optical parameters, which are used in color evaluation of metallic coating or pearl coating on a surface of the object, based on the reflected light amount, and calculates, using the optical parameters, an index corresponding to luminance of a glittering material used in the metallic coating or the pearl coating, wherein
the hardware processor calculates an index I expressed by a following equation, as the index corresponding to the luminance of the glittering material,
when
the specular reflection direction is 0° in a plane including an incident direction and a specular reflection direction of a principal light beam of the light emitted from the light emitter with respect to the object, and an angle direction inclined from the specular reflection direction toward the incident direction is defined as a positive direction,
n is an integer equal to or greater than 2,
the plurality of angles are respectively set to $\theta_1$ to $\theta_n$, in which the angles $\theta_1$ to $\theta_n$ are angles within a range of $-15°$ to $45°$ respectively,
the optical parameters obtained for direction of respective angles $\theta_1$ to $\theta_n$ based on the reflected light amount are $I(\theta_1)$ to $I(\theta_n)$ respectively, and
weighting coefficients of the respective optical parameters $I(\theta_1)$ to $I(\theta_n)$ are $a_1$ to $a_n$ respectively, $$I = a_1 \cdot I(\theta_1) + a_2 \cdot I(\theta_2) + \ldots + a_n \cdot I(\theta_n)$$

where
regarding the weighting coefficients $a_1$ to $a_n$, one is positive, another is negative, and rest is positive, negative, or zero.

2. The multi-angle colorimeter according to claim 1, wherein the optical parameters $I(\theta_1)$ to $I(\theta_n)$ are all brightness L*.

3. The multi-angle colorimeter according to claim 1, wherein
n=2, and
regarding the weighting coefficients $a_1$ and $a_2$, one is 1 and other one is $-1$.

4. The multi-angle colorimeter according to claim 1, further comprising
a display that displays the index I calculated by the hardware processor.

5. The multi-angle colorimeter according to claim 2, wherein
n=2, and
regarding the weighting coefficients $a_1$ and $a_2$, one is 1 and other one is $-1$.

6. The multi-angle colorimeter according to claim 2, further comprising
a display that displays the index I calculated by the hardware processor.

7. The multi-angle colorimeter according to claim 3, further comprising
a display that displays the index I calculated by the hardware processor.

8. A multi-angle colorimeter comprising:
a light emitter that emits light onto an object;
a light amount detection unit that receives the light emitted from the light emitter and reflected by the object in a plurality of directions of angles, and detects a reflected light amount in each of the angles; and
a hardware processor that obtains optical parameters, which is used in color evaluation of metallic coating or pearl coating on a surface of the object, based on the reflected light amount, and calculates, using the optical parameters, an index corresponding to luminance of a glittering material used in the metallic coating or the pearl coating, wherein
the hardware processor calculates an index I expressed by a following equation, as the index corresponding to the luminance of the glittering material,
when
the specular reflection direction is 0° in a plane including an incident direction and a specular reflection direction of a principal light beam of the light emitted from the light emitter with respect to the object, and an angle direction inclined from the specular reflection direction toward the incident direction is defined as a positive direction,
n and m are respectively an integer equal to or greater than 2,
the plurality of angles are respectively set to $\theta_1$ to $\theta_n$, in which the angles $\theta_1$ to $\theta_n$ are angles within a range of $-15°$ to $45°$ respectively,
the optical parameters obtained for direction of respective angles $\theta_1$ to $\theta_n$ based on the reflected light amount are $I'_1(\theta_1)$ to $I'_1(\theta_n)$, $I'_2(\theta_1)$ to $I'_2(\theta_n)$, ..., $I'_m(\theta_1)$ to $I'_m(\theta_n)$ for each different wavelength band or each different wavelength, respectively, and
weighting coefficients of the respective optical parameters $I'_1(\theta_1)$ to $I'_1(\theta_n)$, $I'_2(\theta_1)$ to $I'_2(\theta_n)$, ..., $I'_m(\theta_1)$ to $I'_m(\theta_n)$ are $a_1$ to $a_n$ respectively, $$I_1 = a_1 \cdot I'_1(\theta_1) + a_2 \cdot I'_1(\theta_2) + \ldots + a_n \cdot I'_1(\theta_n)$$
$$I_2 = a_1 \cdot I'_2(\theta_1) + a_2 \cdot I'_2(\theta_2) + \ldots + a_n \cdot I'_2(\theta_n)$$
$$\ldots$$
$$I_m = a_1 \cdot I'_m(\theta_1) + a_2 \cdot I'_m(\theta_2) + \ldots + a_n \cdot I'_m(\theta_n)$$
$$I = I_1 + I_2 + \ldots + I_m$$

where regarding the weighting coefficients $a_1$ to $a_n$, one is positive, another is negative, and rest is positive, negative, or zero.

9. The multi-angle colorimeter according to claim 8, wherein the optical parameters are tristimulus values XYZ, and when $$I'_1(\theta_1) \text{ to } I'_1(\theta_n) = X(\theta_1) \text{ to } X(\theta_n)$$

$$I'_2(\theta_1) \text{ to } I'_2(\theta_n) = Y(\theta_1) \text{ to } Y(\theta_n)$$

$$I'_3(\theta_1) \text{ to } I'_3(\theta_n) = Z(\theta_1) \text{ to } Z(\theta_n),$$

$$I_1 = I'_x = a_1 \cdot X(\theta_1) + a_2 \cdot X(\theta_2) + \ldots + a_n \cdot X(\theta_n)$$

$$I_2 = I'_y = a_1 \cdot Y(\theta_1) + a_2 \cdot Y(\theta_2) + \ldots + a_n \cdot Y(\theta_n)$$

$$I_3 = I'_z = a_1 \cdot Z(\theta_1) + a_2 \cdot Z(\theta_2) + \ldots + a_n \cdot Z(\theta_n)$$

and $$I = I'_x + I'_y + I'_z.$$

10. The multi-angle colorimeter according to claim 8, wherein the optical parameters are spectral reflectance $Ref(\lambda, \theta)$ of the plurality of wavelengths $\lambda$, and when $$I'_1(\theta_1) \text{ to } I'_1(\theta_n) = Ref(\lambda_1, \theta_1) \text{ to } Ref(\lambda_1, \theta_n)$$
$$I'_2(\theta_1) \text{ to } I'_2(\theta_n) = Ref(\lambda_2, \theta_1) \text{ to } Ref(\lambda_2, \theta_n)$$
$$\ldots$$
$$I'_m(\theta_1) \text{ to } I'_m(\theta_n) = Ref(\lambda_m, \theta_1) \text{ to } Ref(\lambda_m, \theta_n)$$

where the plurality of wavelengths $\lambda$ are $\lambda_1, \lambda_2, \ldots, \lambda_m$, $$I_1 = a_1 \cdot Ref(\lambda_1, \theta_1) + a_2 \cdot Ref(\lambda_1, \theta_2) + \ldots + a_n \cdot Ref(\lambda_1, \theta_n)$$
$$I_2 = a_1 \cdot Ref(\lambda_2, \theta_1) + a_2 \cdot Ref(\lambda_2, \theta_2) + \ldots + a_n \cdot Ref(\lambda_2, \theta_n)$$
$$\ldots$$
$$I_m = a_1 \cdot Ref(\lambda_m, \theta_1) + a_2 \cdot Ref(\lambda_m, \theta_2) + \ldots + a_n \cdot Ref(\lambda_m, \theta_n),$$
and
$$I = I_1 + I_2 + \ldots + I_m.$$

11. The multi-angle colorimeter according to claim 8, wherein n=2, and regarding the weighting coefficients $a_1$ and $a_2$, one is 1 and other one is −1.

12. The multi-angle colorimeter according to claim 8, further comprising a display that displays the index I calculated by the hardware processor.

13. The multi-angle colorimeter according to claim 9, wherein n=2, and regarding the weighting coefficients $a_1$ and $a_2$, one is 1 and other one is −1.

14. The multi-angle colorimeter according to claim 9, further comprising a display that displays the index I calculated by the hardware processor.

15. The multi-angle colorimeter according to claim 10, wherein n=2, and regarding the weighting coefficients $a_1$ and $a_2$, one is 1 and other one is −1.

16. The multi-angle colorimeter according to claim 10, further comprising a display that displays the index I calculated by the hardware processor.

17. A multi-angle colorimeter comprising:

a light emitter that emits light onto an object;

a light amount detection unit that receives the light emitted from the light emitter and reflected by the object in a plurality of directions of angles, and detects a reflected light amount in each of the angles; and a hardware processor that obtains optical parameters, which is used in color evaluation of metallic coating or pearl coating on a surface of the object, based on the reflected light amount, and calculates, using the optical parameters, an index corresponding to luminance of a glittering material used in the metallic coating or the pearl coating, wherein the hardware processor calculates an index I expressed by a following equation, as the index corresponding to the luminance of the glittering material, when the specular reflection direction is 0° in a plane including an incident direction and a specular reflection direction of a principal light beam of the light emitted from the light emitter with respect to the object, and an angle direction inclined from the specular reflection direction toward the incident direction is defined as a positive direction, n and m are respectively an integer equal to or greater than 2, the plurality of angles are respectively set to $\theta_1$ to $\theta_n$, in which the angles $\theta_1$ to $\theta_n$ are angles within a range of −15° to 45° respectively, the optical parameters obtained for direction of respective angles $\theta_1$ to $\theta_n$ based on the reflected light amount are two types of $J(\theta)$ and $K(\theta)$ where at least one of $J(\theta)$ and $K(\theta)$ has wavelength dependency, $$J(\theta) = J_1(\theta_1) \text{ to } J_1(\theta_n), J_2(\theta_1) \text{ to } J_2(\theta_n), \ldots J_m(\theta_1) \text{ to } J_m(\theta_n),$$

$$K(\theta) = K_1(\theta_P), K_2(\theta_P), K_3(\theta_P), \ldots, K_m(\theta_P), \text{ where } P \text{ is an integer of any one of 1 to } n, \text{ and}$$

the weighting coefficients of the respective optical parameters $J(\theta)$ are respectively two types of $a_1$ to $a_n$ and $b_1$ to $b_n$, $$I_1 = [\{a_1 \cdot J_1(\theta_1) + a_2 \cdot J_1(\theta_2) + \ldots + a_n \cdot J_1(\theta_n)\} / \{b_1 \cdot J_1(\theta_1) + b_2 \cdot J_1(\theta_2) + \ldots + b_n \cdot J_1(\theta_n)\}] \cdot K_1(\theta_P)$$

-continued $$I_2 = [\{a_1 \cdot J_2(\theta_1) + a_2 \cdot J_2(\theta_2) + \ldots + a_n \cdot J_2(\theta_n)\}/\{b_1 \cdot J_2(\theta_1) + b_2 \cdot J_2(\theta_2) + \ldots + b_n \cdot J_2(\theta_n)\}] \cdot K_2(\theta_P)$$

$$\ldots$$

$$I_m = [\{a_1 \cdot J_m(\theta_1) + a_2 \cdot J_m(\theta_2) + \ldots + a_n \cdot J_m(\theta_n)\}/\{b_1 \cdot J_m(\theta_1) + b_2 \cdot J_m(\theta_2) + \ldots + b_n \cdot J_m(\theta_n)\}] \cdot K_m(\theta_P)$$

$$I = I_1 + I_2 + \ldots + I_m$$

where regarding the weighting coefficients $a_1$ to $a_n$, one is positive, another is negative, and rest is positive, negative, or zero, and each of the weighting coefficients $b_1$ to $b_n$ is any of positive, negative, and zero, except a case where all are zero.

18. The multi-angle colorimeter according to claim 17, wherein $J(\theta)$ is a tristimulus value XYZ, and $K(\theta)$ is brightness L*, $$I_1 = [\{a_1 \cdot X(\theta_1) + a_2 \cdot X(\theta_2) + \ldots + a_n \cdot X(\theta_n)\}/\{b_1 \cdot X(\theta_1) + b_2 \cdot X(\theta_2) + \ldots + b_n \cdot X(\theta_n)\}]L^*(\theta_P)$$

$$I_2 = [\{a_1 \cdot Y(\theta_1) + a_2 \cdot Y(\theta_2) + \ldots + a_n \cdot Y(\theta_n)\}/\{b_1 \cdot Y(\theta_1) + b_2 \cdot Y(\theta_2) + \ldots + b_n \cdot Y(\theta_n)\}]L^*(\theta_P)$$

$$I_3 = [\{a_1 \cdot Z(\theta_1) + a_2 \cdot Z(\theta_2) + \ldots + a_n \cdot Z(\theta_n)\}/\{b_1 \cdot Z(\theta_1) + b_2 \cdot Z(\theta_2) + \ldots + b_n \cdot Z(\theta_n)\}]L^*(\theta_P)$$

$$I = I_1 + I_2 + I_3.$$

19. The multi-angle colorimeter according to claim 17, wherein each of the weighting coefficients $b_1$ to $b_n$ is 1.

20. The multi-angle colorimeter according to claim 17, further comprising a display that displays the index I calculated by the hardware processor.

* * * * *